US012250400B2

(12) United States Patent
Liang et al.

(10) Patent No.: US 12,250,400 B2
(45) Date of Patent: Mar. 11, 2025

(54) UNIFIED SPACE-TIME INTERPOLATION OF VIDEO INFORMATION

(71) Applicant: Microsoft Technology Licensing, LLC, Redmond, WA (US)

(72) Inventors: Luming Liang, Redmond, WA (US); Zhicheng Geng, Austin, TX (US); Ilya Dmitriyevich Zharkov, Sammamish, WA (US); Tianyu Ding, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 528 days.

(21) Appl. No.: 17/670,978

(22) Filed: Feb. 14, 2022

(65) Prior Publication Data

US 2023/0262259 A1 Aug. 17, 2023

(51) Int. Cl.
*H04N 19/587* (2014.01)
*H04N 19/132* (2014.01)
(Continued)

(52) U.S. Cl.
CPC ......... *H04N 19/587* (2014.11); *H04N 19/132* (2014.11); *H04N 19/31* (2014.11);
(Continued)

(58) Field of Classification Search
None
See application file for complete search history.

(56) References Cited

U.S. PATENT DOCUMENTS

| 10,733,704 B2 * | 8/2020 | Bar-On | H04N 19/31 |
| 11,765,360 B2 * | 9/2023 | Schroers | G06N 3/0464 |
| | | | 375/240.02 |

(Continued)

FOREIGN PATENT DOCUMENTS

| CN | 110415170 A | * 11/2019 | G06N 3/084 |
| CN | 112070677 A | * 12/2020 | G06T 3/4046 |

(Continued)

OTHER PUBLICATIONS

Xiao et al. "Space-time super-resolution for satellite video: A joint framework based on multi-scale spatial-temporal transformer" (Year: 2022).*

(Continued)

*Primary Examiner* — Mohammed Jebari

(57) ABSTRACT

A technique is described herein for temporally and spatially interpolating input video information, to produce output video information having a higher frame rate and a higher resolution compared to that exhibited by the input video information. The technique generates feature information based on plural frames of the input video information. The technique then produces the output video information based on the feature information using an architecture having, in order, a multi-stage encoding operation, a query-generating operation, and a multi-stage decoding operation. Each encoding stage produces an instance of encoder attention information that expresses identified relations across the plural frames of the input video information. Each decoding stage operates on an instance of encoder attention information produced by a corresponding encoding stage. The transformer architecture is compact and is capable of interpolating the input video information in real time.

17 Claims, 10 Drawing Sheets

(51) Int. Cl.
H04N 19/31 (2014.01)
H04N 19/33 (2014.01)
H04N 19/42 (2014.01)
H04N 19/59 (2014.01)
H04N 19/61 (2014.01)

(52) U.S. Cl.
CPC ............. H04N 19/33 (2014.11); H04N 19/59 (2014.11); H04N 19/61 (2014.11); *H04N 19/439* (2014.11)

(56) References Cited

U.S. PATENT DOCUMENTS

| | | | | |
|---|---|---|---|---|
| 2013/0301933 | A1* | 11/2013 | Salvador | G06T 3/4053 382/263 |
| 2014/0177706 | A1* | 6/2014 | Fernandes | H04N 19/59 375/240.03 |
| 2015/0023611 | A1* | 1/2015 | Salvador | G06T 3/4053 382/263 |
| 2015/0104116 | A1* | 4/2015 | Salvador | H04N 7/0117 382/300 |
| 2015/0172726 | A1* | 6/2015 | Faramarzi | H04N 19/117 375/240.24 |
| 2019/0122117 | A1* | 4/2019 | Miyazaki | G06N 3/045 |
| 2022/0284267 | A1* | 9/2022 | Vitthaladevuni | G06N 3/045 |
| 2023/0081916 | A1* | 3/2023 | Chee | G06T 5/70 382/275 |

FOREIGN PATENT DOCUMENTS

| | | | | |
|---|---|---|---|---|
| CN | 112862688 | B * | 11/2021 | ............. G06K 9/629 |
| CN | 113747242 | A * | 12/2021 | ............. G06N 3/08 |
| CN | 114092339 | A * | 2/2022 | |
| WO | WO-2023081095 | A1 * | 5/2023 | |

OTHER PUBLICATIONS

Xiao et al. "Convolutional Hierarchical Attention Network for Query-Focused Video Summarization" (Year: 2020).*
Pu et al. "ED-ACNN: Novel attention convolutional neural network based on encoder-decoder framework for human traffic prediction" (Year: 2020).*
Geng, et al., "RSTT: Real-time Spatial Temporal Transformer for Space-Time Video Super-Resolution," arXiv, e-prints, arXiv:2203.14186v1 [cs.CV], Mar. 27, 2022, 12 pages.
Geng, et al., "RSTT: Real-time Spatial Temporal Transformer for Space-Time Video Super-Resolution," in 2022 IEEE/CVF Conference on Computer Vision and Pattern Recognition (CVPR), Jun. 2022, pp. 17420-17430.
Bao, et al., "Depth-Aware Video Frame Interpolation," open access version of paper in Proceeding of the 2019 IEEE/CVF Conference on Computer Vision and Pattern Recognition (CVPR), Jun. 2019, 10 pages.
Bao, et al., "MEMC-Net: Motion Estimation and Motion Compensation Driven Neural Network for Video Interpolation and Enhancement," in IEEE Transactions on Pattern Analysis and Machine Intelligence, vol. 43, No. 3, Mar. 2021, pp. 933-948.
Brown, et al., "Language Models are Few-Shot Learners," arXiv e-prints, arXiv:2005.14165v4 [cs.CL], Jul. 22, 2020, 75 pages.
Caballero, et al., "Real-Time Video Super-Resolution with Spatio-Temporal Networks and Motion Compensation," open access version of paper in 2017 IEEE Conference on Computer Vision and Pattern Recognition (CVPR), 2017, 10 pages.
Chen, et al., "Pre-Trained Image Processing Transformer," open access version of paper in 2021 IEEE/CVF Conference on Computer Vision and Pattern Recognition (CVPR), Jun. 2021, 12 pages.
Cheng, et al., "Multiple Video Frame Interpolation via Enhanced Deformable Separable Convolution," arXiv e-prints, arXiv:2006.08070v2 [cs.CV], Jan. 25, 2021, 18 pages.

Cheng, et al., "Video Frame Interpolation via Deformable Separable Convolution," in Proceedings of the AAAI Conference on Artificial Intelligence, 34(07), 2020, pp. 10607-10614.
Claus, et al., "ViDeNN: Deep Blind Video Denoising," in Proceedings of the 2019 IEEE/CVF Conference on Computer Vision and Pattern Recognition Workshops (CVPRW), 2019, 10 pages.
Dai, et al., "Deformable Convolutional Networks," open access version of paper in 2017 IEEE International Conference on Computer Vision (ICCV), 2017, 10 pages.
Devlin, et al., "BERT: Pre-training of Deep Bidirectional Transformers for Language Understanding," arXiv e-prints, arXiv:1810.04805v2 [cs.CL], May 24, 2019, 16 pages.
Ding, et al., "CDFI: Compression-Driven Network Design for Frame Interpolation," open access version of paper in 2021 IEEE/CVF Conference on Computer Vision and Pattern Recognition (CVPR), Jun. 2021, 11 pages.
Dosovitskiy, et al., "An Image is Worth 16x16 Words: Transformers for Image Recognition at Scale," arXiv e-prints, arXiv:2010.11929v2 [cs.CV], Jun. 3, 2021, 22 pages.
Gotmare, et al., "A Closer Look at Deep Learning Heuristics: Learning rate restarts, Warmup and Distillation," arXiv e-prints, arXiv:1810.13243v1 [cs.LG], Oct. 29, 2018, 18 pages.
Haris, et al., "Recurrent Back-Projection Network for Video Super-Resolution," open access version of paper in 2019 IEEE/CVF Conference on Computer Vision and Pattern Recognition (CVPR), 2019, 10 pages.
Haris, et al., "Space-Time-Aware Multi-Resolution Video Enhancement," in 2020 IEEE/CVF Conference on Computer Vision and Pattern Recognition (CVPR), Jun. 2020, 10 pages.
Jiang, et al., "Super SloMo: High Quality Estimation of Multiple Intermediate Frames for Video Interpolation," open access version of paper in 2018 IEEE/CVF Conference on Computer Vision and Pattern Recognition, 2018, 9 pages.
Jo, et al., "Deep Video Super-Resolution Network Using Dynamic Upsampling Filters Without Explicit Motion Compensation," open access version of paper in 2018 IEEE/CVF Conference on Computer Vision and Pattern Recognition, 2018, 9 pages.
Kim, et al., "Deep Video Inpainting," open access version of paper in 2019 IEEE/CVF Conference on Computer Vision and Pattern Recognition (CVPR), 2019, 10 pages.
Lee, et al., "AdaCoF: Adaptive Collaboration of Flows for Video Frame Interpolation," open access version of paper in 2020 IEEE/CVF Conference on Computer Vision and Pattern Recognition (CVPR), 2020, 10 pages.
Liang, et al., "SwinIR: Image Restoration Using Swin Transformer," open access version of paper in 2021 IEEE/CVF International Conference on Computer Vision Workshops (ICCVW), Oct. 2021, 12 pages.
Liu, et al., "A Bayesian Approach to Adaptive Video Super Resolution," in CVPR 2011, 2011, pp. 209-216.
Liu, et al., "Video Super Resolution Based on Deep Learning: A Comprehensive Survey," arXiv e-prints, arXiv:2007.12928v2 [cs.CV], Dec. 20, 2020, 30 pages.
Liu, et al., "Swin Transformer: Hierarchical Vision Transformer Using Shifted Windows," open access version of paper in IEEE/CVF International Conference on Computer Vision (ICCV), Oct. 2021, 11 pages.
Liu, et al., "Video Frame Synthesis Using Deep Voxel Flow," open access version of paper in 2017 IEEE International Conference on Computer Vision (ICCV), 2017, 9 pages.
Loschilov, et al., "Decoupled Weight Decay Regularization," available at https://openreview.net/forum?id=Bkg6RiCqY7, open review version of paper in 2019 International Conference on Learning Representations (ICLR), modified on May 1, 2019, 18 pages.
Mahajan, et al., "Moving Gradients: A Path-Based Method for Plausible Image Interpolation," in SIGGRAPH '09: ACM SIGGRAPH 2009, Article No. 42, Jul. 2009, 12 pages.
Meyer, et al., "PhaseNet for Video Frame Interpolation," open access version of paper in 2018 IEEE/CVF Conference on Computer Vision and Pattern Recognition, 2018, 10 pages.
Meyer, et al., "Phase-Based Frame Interpolation for Video," open access version of paper in IEEE Conference on Computer Vision and Pattern Recognition (CVPR), 2015, 9 pages.

(56) References Cited

OTHER PUBLICATIONS

Mudenagudi, et al., "Space-Time Super-Resolution Using Graph-Cut Optimization," in IEEE Transactions on Pattern Analysis and Machine Intelligence, vol. 33, No. 5, May 2011, pp. 995-1008.
Niklaus, et al., "Context-Aware Synthesis for Video Frame Interpolation," open access version of paper in IEEE Conference on Computer Vision and Pattern Recognition (CVPR), 2018, 10 pages.
Niklaus, et al., "Softmax Splatting for Video Frame Interpolation," open access version of paper in IEEE/CVF Conference on Computer Vision and Pattern Recognition (CVPR), 2020, 10 pages.
Niklaus, et al., "Video Frame Interpolation via Adaptive Convolution," open access version of paper in 2017 IEEE Conference on Computer Vision and Pattern Recognition (CVPR), 2017, 10 pages.
Niklaus, et al., "Video Frame Interpolation via Adaptive Separable Convolution," open access version of paper in IEEE International Conference on Computer Vision (ICCV), 2017, 10 pages.
Park, et al., "BMBC: Bilateral Motion Estimation with Bilateral Cost Volume for Video Interpolation," arXiv e-prints, arXiv:2007.12622v1 [cs.CV], Jul. 17, 2020, 16 pages.
Ranftl, et al., "Vision Transformers for Dense Prediction," open access version of paper in IEEE/CVF International Conference on Computer Vision (ICCV), Oct. 2021, 10 pages.
Rippel, et al., "Learned Video Compression," open access version of paper in IEEE/CVF International Conference on Computer Vision (ICCV), 2019, 10 pages.
Sajjadi, et al., "Frame-Recurrent Video Super-Resolution," open access version of 2018 IEEE/CVF Conference on Computer Vision and Pattern Recognition, 2018, 9 pages.
Shechtman, et al., "Increasing Space-Time Resolution in Video," ECCV 2002, European Conference on Computer Vision, LNCS 2350, Springer-Verlag Berlin Heidelberg, 2002, pp. 753-768.
Shechtman, et al., "Space-Time Super-Resolution," in IEEE Transactions on Pattern Analysis and Machine Intelligence, vol. 27, No. 4, Apr. 2005, pp. 531-545.
Shi, et al., "Video Frame Interpolation via Generalized Deformable Convolution," arXiv e-prints, arXiv:2008.10680v3 [cs.CV], Mar. 18, 2021, 13 pages.
Strudel, "Segmenter: Transformer for Semantic Segmentation," arXiv e-prints, arXiv:2105.05633v3 [cs.CV], Sep. 2, 2021, 17 pages.
Tag, et al., "In the Eye of the Beholder: The Impact of Frame Rate on Human Eye Blink," in CHI EA '16: Proceedings of the 2016 CHI Conference Extended Abstracts on Human Factors in Computing Systems, May 2016, pp. 2321-2327.
Tao, et al., "Detail-Revealing Deep Video Super-Resolution," open access version of paper in 2017 IEEE International Conference on Computer Vision (ICCV), 2017, 9 pages.
Tassano, et al., "FastDVDnet: Towards Real-Time Deep Video Denoising Without Flow Estimation," open access version of paper in 2020 IEEE/CVF Conference on Computer Vision and Pattern Recognition (CVPR), Jun. 2020, 10 pages.
Turletti, et al., "Videoconferencing on the Internet," in IEEE/ACM Transactions on Networking, vol. 4, No. 3, Jun. 1996, pp. 340-351.
Vaswani, et al., "Attention Is All You Need," in 31st Conference on Neural Information Processing Systems (NIPS 2017), 2017, 11 pages.
Wang, et al., "Video Inpainting by Jointly Learning Temporal Structure and Spatial Details," in Proceedings of the Thirty-Third AAAI Conference on Artificial Intelligence (AAAI-19), vol. 33, 2019, pp. 5232-5239.
Wang, et al., "Learning for Video Super-Resolution through HR Optical Flow Estimation," arXiv e-prints, arXiv:1809.08573v2 [cs.CV], Oct. 25, 2018, 10 pages.
Wang, et al., "EDVR: Video Restoration with Enhanced Deformable Convolutional Networks," open access version of paper in 2019 IEEE/CVF Conference on Computer Vision and Pattern Recognition Workshops (CVPRW), 2019, 10 pages.
Wang, et al., "Uformer: A General U-Shaped Transformer for Image Restoration," arXiv e-prints, arXiv:2106.03106v2 [cs.CV], Nov. 25, 2021, 17 pages.

Wu, et al., "Streaming Video over the Internet: Approaches and Directions," in IEEE Transactions on Circuits and Systems for Video Technology, vol. 11, No. 3, 2001, pp. 282-300.
Xiang, et al., "Zooming Slow-Mo: Fast and Accurate One-Stage Space-Time Video Super-Resolution," open access version of paper in 2020 IEEE/CVF Conference on Computer Vision and Pattern Recognition (CVPR), Jun. 2020, 10 pages.
Xiang, et al., "Zooming SlowMo: An Efficient One-Stage Framework for Space-Time Video Super-Resolution," arXiv e-prints, arXiv:2104.07473v1 [cs.CV], Apr. 15, 2021, 14 pages.
Xu, et al., "Temporal Modulation Network for Controllable Space-Time Video Super-Resolution," open access version of paper in 2021 IEEE/CVF Conference on Computer Vision and Pattern Recognition (CVPR), Jun. 2021, 10 pages.
Xu, et al., "BERT, mBERT, or BiBERT? A Study on Contextualized Embeddings for Neural Machine Translation," arXiv e-prints, arXiv:2109.04588v1 [cs.CL], Septemer 9, 2021, 13 pages.
Xu, et al., "End-to-End Semi-Supervised Object Detection with Soft Teacher," arXiv e-prints, arXiv:2106.09018v3 [cs.CV], Aug. 6, 2021, 10 pages.
Xue, et al., "Video Enhancement with Task-Oriented Flow," arXiv e-prints, arXiv:1711.09078v3 [cs.CV], Nov. 10, 2019, 20 pages.
Yang, et al., "Focal Self-attention for Local-Global Interactions in Vision Transformers," arXiv e-prints, arXiv:2107.00641v1 [cs.CV], Jul. 1, 2021, 21 pages.
Tian, et al., "TDAN: Temporally-Deformable Alignment Network for Video Super-Resolution," open access version of paper in 2020 IEEE/CVF Conference on Computer Vision and Pattern Recognition (CVPR), Jun. 2020, 10 pages.
Yuan, et al., "Zoom-In-to-Check: Boosting Video Interpolation via Instance-level Discrimination," open access version of paper published in 2019 IEEE/CVF Conference on Computer Vision and Pattern Recognition (CVPR), 2019, 9 pages.
Zhang, et al., "Image Super-Resolution Using Very Deep Residual Channel Attention Networks," open access version of paper in 2020 IEEE 15th International Conference on Industrial and Information Systems (ICIIS), 2020, 16 pages.
Zheng, et al., "Rethinking Semantic Segmentation from a Sequence-to-Sequence Perspective with Transformers," open access version of paper in 2021 IEEE/CVF Conference on Computer Vision and Pattern Recognition (CVPR), Jun. 2021, 10 pages.
Zhou, et al., "How Video Super-Resolution and Frame Interpolation Mutually Benefit," in MM '21: Proceedings of the 29th ACM International Conference on Multimedia, Oct. 2021, pp. 5445-5453.
Zhu, et al., "Deformable ConvNets v2: More Deformable, Better Results," open access version of paper in 2019 IEEE/CVF Conference on Computer Vision and Pattern Recognition (CVPR), 2019, 9 pages.
Khandelwal, Renu, "SWIN Transformer: A Unifying Step Between Computer Vision and Natural Language Processing," available at https://arshren.medium.com/swin-transformer-a-unifying-step-between-computer-vision-and-natural-language-processing-3fc0e59ff8f2, in Medium, Nov. 8, 2021, 10 pages.
Alammar, Jay, "The Illustrated Transformer," available at http://jalammar.github.io/illustrated-transformer/, Github, Jun. 27, 2018, 23 pages.
Shaw, et al., "Self-Attention with Relative Position Representations," arXiv e-prints, arXiv:1803.02155v2 [cs.CL], Apr. 12, 2018, 5 pages.
Shi, et al., "Real-Time Single Image and Video Super-Resolution Using an Efficient Sub-Pixel Convolutional Neural Network," arXiv e-prints, arXiv:1609.05158v2 [cs.CV], Sep. 23, 2016, 10 pages.
Zhang, et al., "Cross-Frame Transformer-Based Spatio-Temporal Video Super-Resolution," in IEEE Transactions on Broadcasting, vol. 68, No. 2, Jun. 2022, pp. 359-369.
Huang, et al., "Confidence-Based Global Attention Guided Network for Image Inpainting," in MultiMedia Modeling, MMM 2021, Lecture Notes in Computer Science, vol. 12572, Springer, Jan. 21, 2021, pp. 200-212.
Khan, et al., "Transformers in Vision: A Survey," arXiv, Cornell University, arXiv:2101.01169v4 [cs.CV], Oct. 3, 2021, 30 pages.

(56) References Cited

OTHER PUBLICATIONS

PCT Search Report and Written Opinion for PCT/US2022/050038, 16 pages.

\* cited by examiner

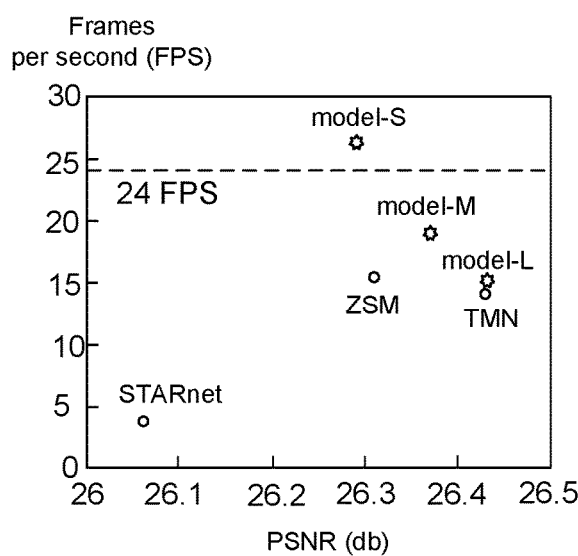

FIG. 10

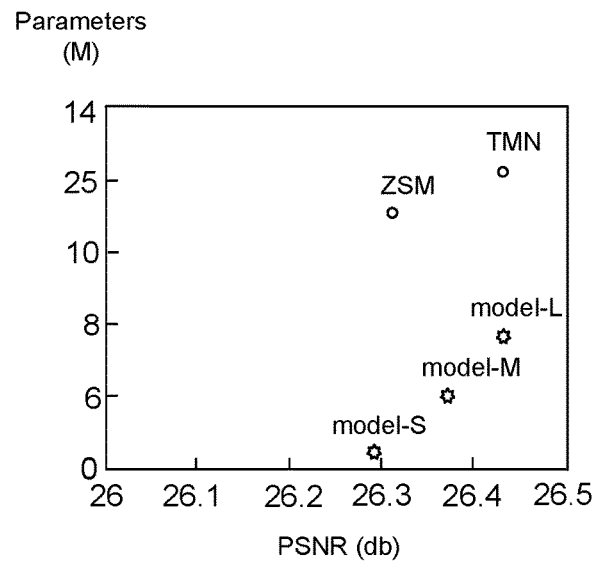

FIG. 11

OVERVIEW OF OPERATION OF THE INTERPOLATING SYSTEM 102
1202

OBTAIN INPUT VIDEO INFORMATION HAVING A GIVEN FIRST NUMBER OF PLURAL FRAMES, EACH FRAME IN THE INPUT VIDEO INFORMATION HAVING A GIVEN FIRST SPATIAL RESOLUTION.
1204

GENERATE FEATURE INFORMATION BASED ON THE INPUT VIDEO INFORMATION.
1206

PRODUCE OUTPUT VIDEO INFORMATION BASED ON THE FEATURE INFORMATION USING A TRANSFORMER-BASED ENCODING OPERATION, FOLLOWED BY A QUERY-GENERATING OPERATION, FOLLOWED BY A TRANSFORMER-BASED DECODING OPERATION, THE TRANSFORMER-BASED DECODING OPERATION BEING PERFORMED BASED ON ENCODER ATTENTION INFORMATION PRODUCED BY THE TRANSFORMER-BASED ENCODING OPERATION, THE ENCODER ATTENTION INFORMATION EXPRESSING IDENTIFIED RELATIONS ACROSS THE PLURAL FRAMES OF THE INPUT VIDEO INFORMATION, THE OUTPUT VIDEO INFORMATION HAVING A SECOND NUMBER OF FRAMES THAT IS HIGHER THAN THE FIRST NUMBER OF FRAMES IN THE INPUT VIDEO INFORMATION, AND HAVING A SECOND SPATIAL RESOLUTION THAT IS HIGHER THAN THE FIRST SPATIAL RESOLUTION OF THE INPUT VIDEO INFORMATION.
1208

FIG. 12

OPERATION OF THE INTERPOLATING SYSTEM 102
1302

OBTAIN INPUT VIDEO INFORMATION HAVING A GIVEN FIRST NUMBER OF PLURAL FRAMES, EACH FRAME IN THE INPUT VIDEO INFORMATION HAVING A GIVEN FIRST SPATIAL RESOLUTION.
1304

GENERATE FEATURE INFORMATION BASED THE INPUT VIDEO INFORMATION.
1306

ENCODE THE FEATURE INFORMATION IN A PIPELINE HAVING PLURAL ENCODING STAGES THAT OPERATE AT DIFFERENT RESPECTIVE RESOLUTIONS, TO PRODUCE PLURAL INSTANCES OF ENCODER ATTENTION INFORMATION AND PLURAL INSTANCES OF ENCODER OUTPUT INFORMATION, EACH INSTANCE OF THE ENCODER ATTENTION INFORMATION EXPRESSING IDENTIFIED RELATIONS ACROSS THE PLURAL FRAMES OF THE INPUT VIDEO INFORMATION.
1308

PRODUCE A QUERY BASED ON AN INSTANCE OF ENCODER OUTPUT INFORMATION PRODUCED BY A LAST ENCODING STAGE OF THE PLURAL ENCODING STAGES.
1310

DECODE THE QUERY IN A PIPELINE HAVING PLURAL DECODING STAGES THAT OPERATE AT DIFFERENT RESPECTIVE RESOLUTIONS, TO PRODUCE PLURAL INSTANCES OF DECODER OUTPUT INFORMATION, EACH DECODING STAGE THAT HAS A PRECEDING DECODING STAGE RECEIVING AN INSTANCE OF DECODING INPUT INFORMATION PRODUCED BY THE PRECEDING DECODING STAGE, AND EACH PARTICULAR DECODING STAGE OPERATING ON AN INSTANCE OF ENCODER ATTENTION INFORMATION PRODUCED BY A PARTICULAR ENCODING STAGE THAT HAS A SAME RESOLUTION LEVEL AS THE PARTICULAR DECODING STAGE.
1312

CONT. FROM FIG. 13

PRODUCE OUTPUT VIDEO INFORMATION BASED ON DECODER OUTPUT INFORMATION PRODUCED BY A LAST DECODING STAGE OF THE PLURAL DECODING STAGES, THE OUTPUT VIDEO INFORMATION HAVING A SECOND NUMBER OF FRAMES THAT IS HIGHER THAN THE FIRST NUMBER OF FRAMES IN THE INPUT VIDEO INFORMATION, AND HAVING A SECOND SPATIAL RESOLUTION THAT IS HIGHER THAN THE FIRST SPATIAL RESOLUTION OF THE INPUT VIDEO INFORMATION.
1402

FIG. 14

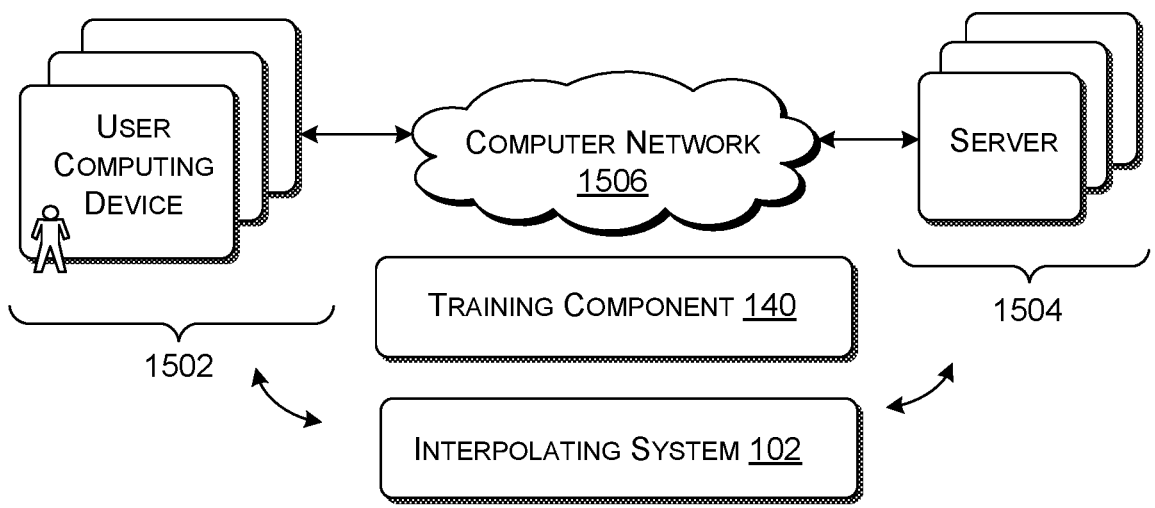

FIG. 15

UNIFIED SPACE-TIME INTERPOLATION OF VIDEO INFORMATION

BACKGROUND

Space-time video super-resolution (STVSR) refers to the task of interpolating input video information to increase its frame rate and spatial resolution. That is, a system can use STVSR to convert low frame rate (LFR) input video information into high frame rate (HFR) output video information, and to convert low resolution (LR) input video information into high resolution (HR) output video information. Known STVSR systems, however, suffer from various inefficiencies. For example, the STVSR systems may rely on large models that can consume a significant amount of computing resources to run. The large models may also negatively impact the speed at which the STVSR systems run, possibly preventing real-time interpolation of input video information by the STVSR systems.

SUMMARY

A technique is described herein for temporally and spatially interpolating input video information in a unified manner. The technique generates feature information that expresses features obtained from plural frames of the input video information. The technique then produces output video information based on the feature information using an architecture having, in order, a multi-stage encoding operation, a query-generating operation, and a multi-stage decoding operation. The output video information includes more frames than the number of frames provided by the input video information. The output video information also has a resolution that is higher than the resolution of the input video information.

In some implementations, the architecture is a transformer-based architecture.

In some implementations, the multi-stage encoding operation includes a pipeline having plural encoding stages that produce plural instances of encoder attention information and plural instances of encoder output information. Each instance of the encoder attention information expresses identified relations across the plural frames of the input video information. Likewise, the multi-stage decoding operation includes a pipeline having plural decoding stages that produce plural instances of decoder output information. In some implementations, the pipeline of encoding stages operate using successively lower resolutions, and the pipeline of decoding stages operate using successively higher resolutions.

In some implementations, the query-generating operation produces a query based on encoder output information provided by a last encoding stage in the pipeline of encoding stages. The first decoding stage in the pipeline of decoding stages receives and operates on the query produced by the query-generating operation, together with encoder attention information provided by the last encoding stage. Each subsequent decoding stage receives an instance of decoder input information produced by its preceding decoding stage. Further, each subsequent decoding stage operates on an instance of encoder attention information produced by a corresponding encoding stage in the pipeline of encoding stages.

In some implementations, each encoding stage and each decoding stage perform window-based attention operations.

The above-summarized architecture devotes the same processing components to perform temporal and spatial interpolation. The above-summarized architecture achieves this result, in part, by producing encoder attention information that expresses identified relations across the plural frames of the input video information, and then consulting this same encoder attention information in the multi-stage decoding operation. This approach differs from other approaches that use some functionality to perform the sole task of temporal interpolation, and other functionality to perform the sole task of spatial interpolation. By virtue of this technical distinction, the above-summarized architecture can use a smaller model than other approaches, e.g., as manifested by a smaller number of machine-trained parameters compared to the other approaches. The above-summarized architecture can also achieve higher frame rates than the other approaches. For instance, in some manifestations, the above-summarized architecture can perform real-time interpolation of input video information.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 shows the performance of the interpolating system of FIG. 1 relative to other interpolating approaches, measured in terms of frames-per-second (FPS).

FIG. 11 shows the size of the interpolating system of FIG. 1 relative to other interpolating approaches, measured in terms of a number of machine-trained parameter values.

FIG. 12 is a flowchart that presents an overview of one manner of operation of the interpolating system of FIG. 1.

FIGS. 13 and 14 together provide a flowchart that presents another overview of one manner of operation of the interpolating system of FIG. 1.

FIG. 15 shows computing equipment that can be used to implement the interpolating system shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative interpolating system for performing space-time video super-resolution (STVSR). Section B sets forth illustrative methods which explain the operation of the interpolating system of Section A. And Section C describes illustrative computing functionality that can be used to implement any aspect of the features described in Sections A and B.

A. Illustrative Interpolating System

Figure 1:
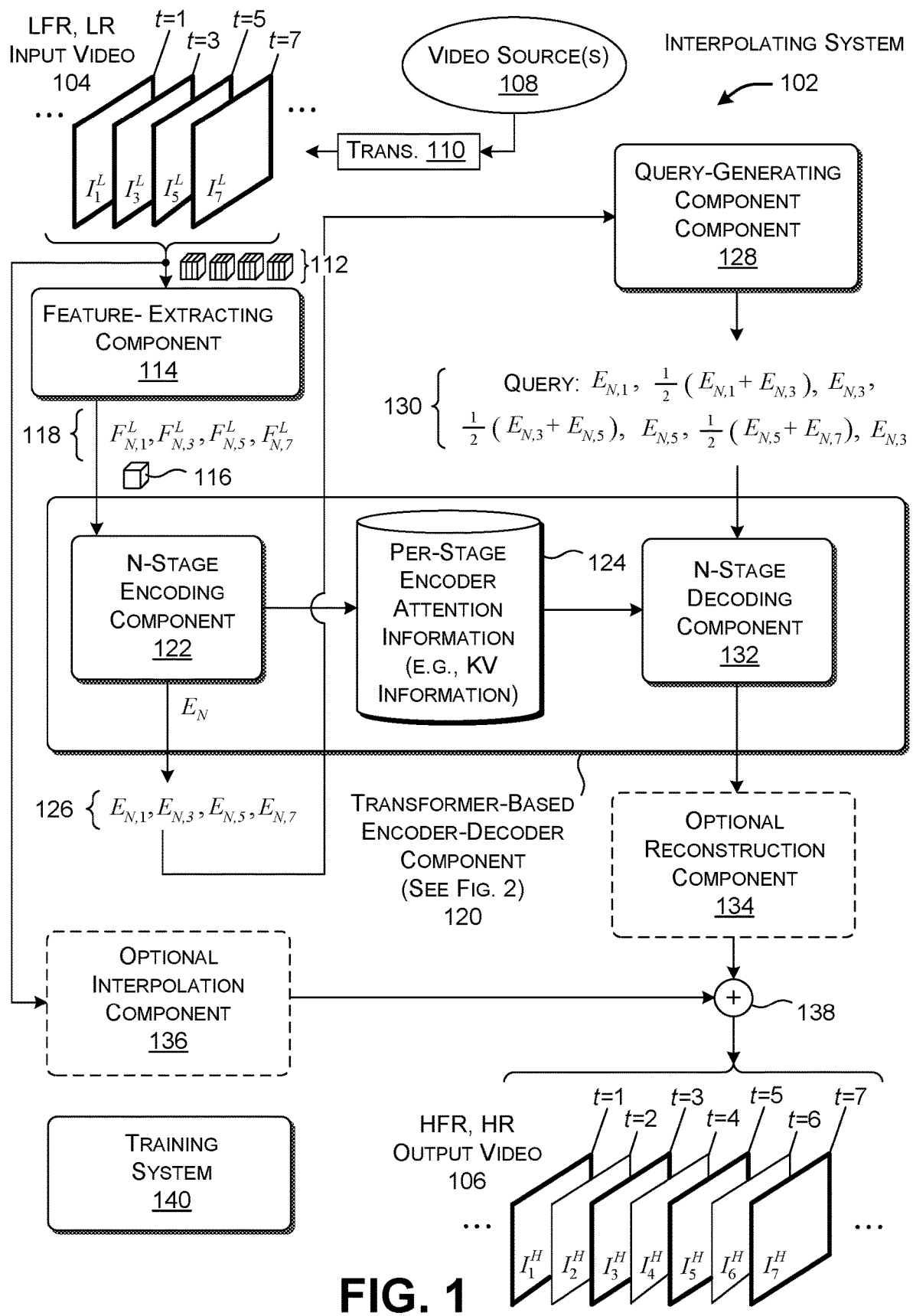
FIG. 1 shows an illustrative interpolating system for performing space-time video super-resolution (STVSR).

FIG. 1 shows an illustrative interpolating system 102 for performing space-time video super-resolution (STVSR). In some implementations, the interpolating system 102 maps an instance of input video information 104 to an instance of output video information 106. The input video information 104 includes a first number of frames, each having a first resolution. The output video information 106 includes a second number of frames, each having a second resolution. The second number of frames is greater than the first number of frames, and the second resolution is greater than the first resolution. For shorthand reference, the input video information 104 will be said to exhibit low frame rate (LFR) and low resolution (LR), while the output video information 106 will be said to exhibit high frame rate (HFR) and high resolution (HR). But the terms "low" and "high" are to be broadly interpreted as relative measures. That is, a frame rate or resolution is said to high because it is higher than some other specified frame rate or resolution. A frame rate or resolution is said to be low because it is lower than some other specified frame rate or resolution.

More specifically, FIG. 1 shows that the input video information 104 includes at least four input video frames, ($I_1^L$, $I_3^L$, $I_5^L$, $I_7^L$), where each numeric subscript identifies a frame number and the superscript "L" designates that these frames are low resolution frames. The output video information 106 includes at least seven output video frames ($I_1^H$, $I_2^H$, $I_3^H$, $I_4^H$, $I_5^H$, $I_6^H$ $I_7^H$), where each numeric subscript identifies a frame number and the superscript "H" designates that these frames are high resolution frames. The output video frames $I_1^H$, $I_3^H$, $I_5^H$, and $I_7^H$ are the respective higher-resolution counterparts of the input video frames $I_1^L$, $I_3^L$, $I_5^L$, and $I_7^L$. The output video information 106 includes new video frames $I_2^H$, $I_4^H$, and $I_6^H$ that do not have direct counterparts in the input video information 104. The use of the interpolating system 102 to convert four video frames to seven video frames is merely illustrative; other implementations of the interpolating system 102 can convert any first number of frames to any second number of video frames, where the second number is larger than the first number.

In some implementations, the input video information 104 is received from a video source 108 that produces video information having low resolution at a low frame rate. For example, the video source 108 may correspond to a video camera that produces LFR and/or LR video information. Here, the interpolating system 102 serves the purpose of increasing the frame rate and resolution of the input video information 104 produced by the video source 108.

In other implementations, a transmission mechanism 110 reduces the frame rate and/or resolution of an original stream of video information produced by the video source 108. For example, the transmission mechanism 110 can include any type of video compression algorithm which reduces the frame rate and/or resolution of the original video information prior to transmitting the video information over a computing network, such as the Internet, or any other communication channel. Here, the interpolating system 102 serves the purpose of increasing the frame rate and/or resolution of the video information that is received over the transmission mechanism 110. In some cases, the interpolating system 102 can restore the video information to its original frame rate and/or resolution, or an approximation thereof.

More specifically, consider the case of a video teleconferencing system (not shown) having at least one transmitting device and at least one receiving device. The transmitting computing device may reduce the frame rate and/or resolution of captured video information to produce LFR/LR video information, and then transmit that LFR/LR video information over a computing network. This strategy helps reduce congestion in the computing network, and better ensures that a communication session among participants will not be interrupted by bandwidth limits or other communication anomalies. The receiving computing device convert the LFR/LR video information into counterpart HFR/HR video information. Still other applications are possible; the above examples are presented by way of illustration, not limitation.

In other cases, the interpolating system 102 performs the more targeted task of reconstituting an approximation of at least one video frame that has been lost from an original stream of video frames. For example, assume that an original stream of video frames includes frames $I_1^L$, $I_2^L$, $I_3^L$, $I_4^L$, $I_5^L$, $I_6^L$, and so on. But assume that the frame $I_4^L$ is lost by the transmission mechanism 110 over the course of its transmission, e.g., because of a packet drop or any other communication failure. Here, the interpolating system 102 can detect the omission of the video frame $I_4^L$ based on the timing at which it is received relative to its neighboring video frames, and/or based on metadata expressed in the received video information. The interpolating system 102 can apply the principles described below to reconstitute a high-resolution version of the missing video frame, together with high-resolution versions of the video frames that have been received.

With the above introduction, the processing flow of the interpolating system 102 will now be described, from beginning to end. Later figures and accompanying description will provide additional details regarding the introductory explanation provided with respect to FIG. 1.

In some implementations, the input video information 104 includes four frames, each of which has a red (R) channel, a blue channel (B), and a green channel (G). Each frame has a given width (W) and a height (H). Altogether, then, the input video information 104 includes a block of input information 112 of size W×H×12. A feature-extracting component 114 extracts features from this block of input information 112 to produce a block of feature information 116 having a size of W×H×C. C refers to the number of features used to describe each image element of the input video information 104. In some non-limiting implementations, C=96. The block of feature information 116 can also be viewed as a concatenation of plural instances of feature information ($F_1^L$, $F_3^L$, $F_7^L$, $F_7^L$) 118 associated with the four input video frames ($I_1^L$, $I_3^L$, $I_4^L$, $I_7^L$).

More specifically, in some non-limiting implementations, the feature-extracting component 114 can produce the block of feature information 116 by applying a 3×3 convolutional kernel over the block of input information 112. That is, to perform this operation, the feature-extracting component 114 moves the convolutional kernel across the block of input information 112 in predetermined increments. At each position of the kernel, the feature-extracting component 114 forms the dot product of the values in the kernel with the values in a section of the input information 112 that is demarcated by the kernel at its current position. The dot product at this position represents part of the block of feature information 116 produced by the feature-extracting component 114.

An encoder-decoder component 120 operates on the block of feature information 116 in plural respective encoding and decoding stages. To begin with, an N-stage encoding component 122 processes the block of feature information 116 in a pipeline that includes plural (N) encoding stages. Each encoding stage receives encoder input information and produces encoder output information. The encoder input information fed to the first encoding stage is the block of feature information 116 itself. The encoder input information fed to each subsequent encoding stage is the output encoder information provided by its immediately-preceding encoding stage.

Each encoding stage also performs an attention operation that produces an instance of encoder attention information. As will be explained below, each instance of encoder attention information generated by a particular encoding stage expresses relations among image elements that have been identified within its encoder input information. That is, each relation between a first and second image elements expresses an assessed importance that the second image element has to the interpretation of the first image element. Different implementations of the encoder-decoder component 120 can establish what constitutes an "image element" for analysis in different respective ways. In some implementations, an image element may correspond to feature information that derives from an individual pixel that appears in the input video information 104. In other implementations, an image element may correspond to feature information that derives from a patch of pixels that appear in the input video information 104. A data store 124 stores plural instances of encoder attention operation generated by the N-stage encoding component 122.

Note that the attention operation performed by a particular encoding stage operates on input information that derives from all four of the video frames. Hence, the attention operation identifies relations that include both intra-frame relations and inter-frame relations. Intra-frame relations express relations between different image elements in any given video frame. Inter-frame relations express relations between image elements of different video frames.

A last encoding stage in the pipeline of encoding stages produces encoder output information 126. The encoder output information includes plural instances of encoder output information ($E_{N,1}$, $E_{N,3}$, $E_{N,5}$, $E_{N,7}$) respectively associated with the four input video frames ($I_1^L$, $I_3^L$, $I_7^L$, $I_7^L$). The subscript N in the encoder output information indicates that the encoder information is provided by the Nth encoding stage of the N-stage encoding component 122.

Next, a query-generating component 128 generates a query 130 based on the encoder output information 126 of the last encoding stage. The query 130 is a seven-slot structure that includes seven instances of encoding information from which the decoding stages will produce seven video frames of the output video information 106. In some non-limiting implementations, the query-generating component 128 uses $E_{N,1}$, $E_{N,3}$, $E_{N,5}$, and $E_{N,7}$ of the encoder output information 126 to fill in the first, third, fifth, and seventh slots of query 130, respectively. The query-generating component 128 can fill in each remaining slot of the query 130 by computing an average of the encoder output information on either side of the slot. For example, for the second slot of the query 130, the query-generating component 128 can compute the mean of $E_{N,1}$ and $E_{N,3}$, e.g., based on ½ ($E_{N,1}+E_{N,3}$). From a higher-level perspective, the query 130 expresses seed information from which the decoding stages will construct seven output video frames.

Other implementations of the query-generating component 128 can use other algorithms to generate the query 130 compared to the approach described above. For example, other implementations can take into consideration more than two instances of encoder output information (associated with more than two input video frames) in constituting any slot of the query 130. In addition, or alternatively, other implementations can apply different weights to the different instances of encoder output information 126 that are used to constitute any slot of the query 130.

Next, an N-stage decoding component 132 of the encoder-decoder component 120 processes the query 130 in a pipeline that includes plural (N) decoding stages. Each decoding stage receives decoder input information and produces decoder output information. The decoder input information fed to the first decoding stage is the query 130. The decoder input information fed to each subsequent decoding stage is the output decoder information provided by its immediately-preceding decoding stage. As will be explained in greater detail below, each decoding stage also operates on an instance of encoder attention information produced by a corresponding encoding stage. That is, each particular decoding stage has a counterpart encoding stage. Each particular decoding stage receives encoder attention information from its counterpart encoding stage.

In some implementations, the decoder output information produced by the last decoding stage (referred to below as the last-stage decoder output information) constitutes the output video information 106 itself. In other implementations, an optional reconstruction component 134 performs post-processing operations on the last-stage decoder output information, to produce reconstructed information. The interpolating system 102 uses the reconstructed information to produce the output video information 106. The post-processing operations can include a pixel shuffle operation that distributes information imparted by the last-stage decoder output information among the three color channels of the seven output video frames. In addition, or alternatively, the post-processing operations can include any type(s) of machine-trained processing layers, such as one or more convolution layers. In any event, the reconstruction component 134, if it is used at all, can perform post-processing operations that are less computationally intensive compared to other STVSR approaches. This is because the interpolating system 102 produces accurate results even in absence of complex post-processing operations.

In some implementations, the interpolating system 102 is trained to produce last-stage decoder output information that represents the video output information 106 itself, without further reference to the input video information 104. In other implementations, the interpolating system 102 is trained to produce last-stage decoder output information that represents residual information, that, when combined with information extracted from the original video information 104, is used to produce the output video information 106. In the latter case, an optional interpolation component 136 is used to perform tri-linear interpolation on the four frames of the input video information 104 to produce a first rough approximation of the output video information 106. A combining component 138 then combines the interpolated information produced by interpolation component 136 with the last-stage decoder output information produced by the N-stage decoding component 132 (or the reconstructed information produced by the reconstruction component 134), to produce the output video information 106. For example, the combining component 138 can add the residual information to the interpolated information to produce the output video information 106.

A training system 140 is used to train the machine-trained model(s) used by the interpolating system 102. The training system 140 can perform training with reference to a training set that includes LFR/LR video snippets, each video frame of which is denoted by $I^L$. The training system 140 can use the interpolating system 102 to generate HFR/HR counterparts to the LFR/LR video snippets, each video frame of which is denoted by $\hat{I}^H$. The training system 140 can iteratively train the interpolating system 102 to reduce the differences between the generated HFR/HR video frames and their ground truth counterparts, each of which is denoted by $I^H$. That is, the training system 140 can perform training based on the following loss function $$L(\hat{I}^H, I^H) = \sqrt{\left\|\hat{I}^H - I^H\right\|^2 + \epsilon^2},$$

where $\epsilon$ is an error term.

Figure 2:
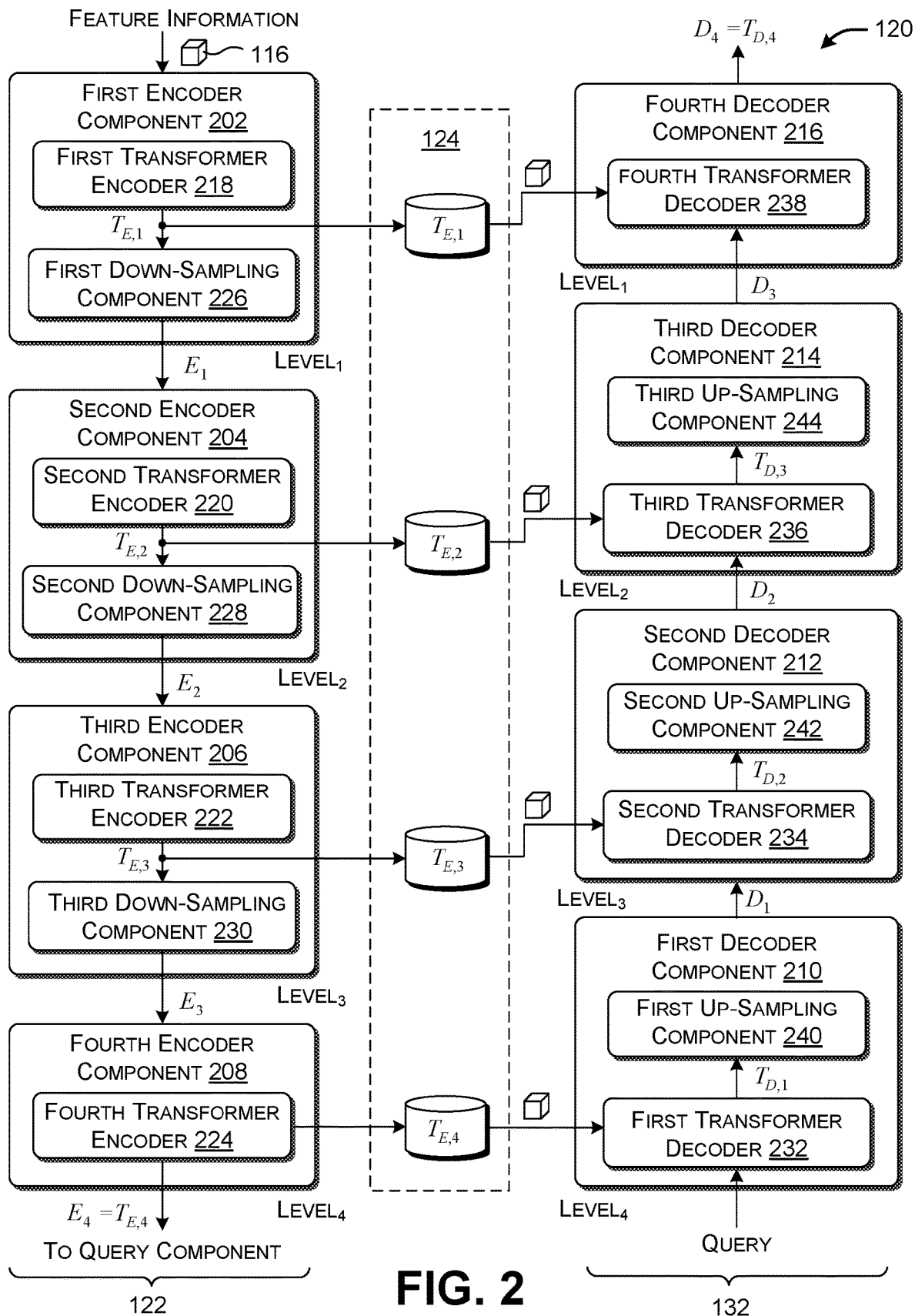
FIG. 2 shows an encoder-decoder component for use in the interpolating system of FIG. 1.

Advancing to FIG. 2, this figure shows the encoder-decoder component 120 introduced in FIG. 1. The encoder-decoder component 120 includes the N-stage encoding component 122 and the N-stage decoding component 132. The N-stage encoding component 122 provides a pipeline having a plurality of encoder components (202, 204, 206, 208), while the N-stage decoding component 132 provides a pipeline having a plurality of decoder components (210, 212, 214, 216). The use of four-stage pipelines is shown by way of example, not limitation. Other implementations of the encoder-decoder component 120 can include less than four stages or more than four stages.

The encoder and decoder components perform processing at different resolutions. For example, the first encoder component 202 performs a first-stage encoding operation on the block of feature information 116 having an original height H and an original width W. The fourth decoder component 216 performs a last-stage decoding operation and operates at the same resolution as the first encoder component 202. The second encoder component 204 and the third decoder component 214 operate at a resolution of H/2 and W/2. The third encoder component 206 and the second decoder component 212 operate at a resolution of H/4 and W/4. Finally, the fourth encoder component 208 and the first decoder component 210 operate at a resolution of H/8 and W/8. Other implementations can successively decrease and increase resolution at other increments compared to the increments described above. Generally, the encoder-decoder system 120 performs analysis at different resolutions to capture details in the input video information 104 at different respective scales. This strategy ultimately improves the quality of the output video information 106.

Each encoder component includes a transformer encoder followed by a down-sampling component (except for the fourth encoder component 208, which does not include a down-sampling component). That is, the encoder components (202, 204, 206, 208) include respective transformer encoders (218, 220, 222, 224), and the encoder components (202, 204, 206) include respective down-sampling components (226, 228, 230). Each decoder component includes a transformer decoder followed by an up-sampling component (except for the fourth decoder component 216, which does not include an up-sampling component). That is, the decoder components (210, 212, 214, 216) include respective transformer decoders (232, 234, 236, 238), and the decoder components (210, 212, 214) include respective up-sampling components (240, 242, 244).

Each transformer encoder processes encoder input information fed to the transformer encoder, to produce encoder attention information. For example, the transformer encoder 218 of the first encoder component 202 converts the encoder input information (here, the block of feature information 116) into encoder attention information $T_{E,1}$. One implementation of the transformer encoder will be described below with reference to FIGS. 3 and 5. Each down-sampling component down-samples the encoder attention information, to produce decoder output information, e.g., using a convolutional layer with a stride two. For example, the down-sampling component 226 down-samples the encoder attention information $T_{E,1}$ to produce first-stage encoder output information $E_1$.

Each transformer decoder processes decoder input information fed to the transformer decoder, in combination with same-stage encoder attention information, to produce decoder attention information. For example, the transformer decoder 232 of the first decoder component 210 converts the decoder information (here, the query 130), in combination with the fourth-stage encoder attention information $T_{E,4}$, into decoder attention information $T_{D,1}$. One implementation of the transformer decoder will be described below in connection with FIGS. 4 and 9. Each up-sampling component up-samples the decoder attention information, to produce decoder output information, e.g., using a de-convolution operation. For example, the up-sampling component 240 up-samples the decoder attention information $T_{D,1}$ to produce first-stage decoder output information D1. Altogether, the down-sampling and up-sampling components (226, 228, 230, 240, 242, and 244) achieve the step-downs and step-ups in resolution summarized above.

Figure 3:
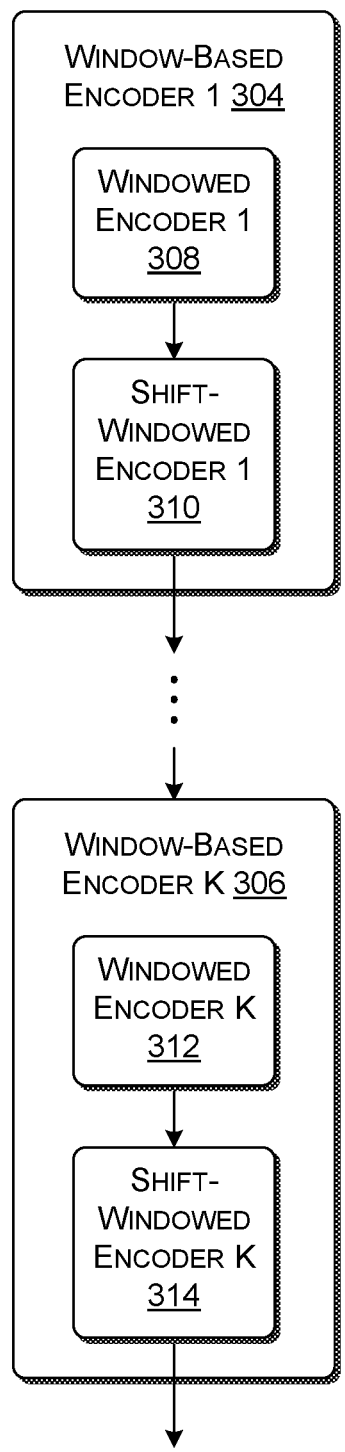
FIG. 3 shows a representative transformer encoder for use in the encoder-decoder component of FIG. 2.

FIG. 3 shows a representative transformer encoder 302 for use in the transformer-based encoder-decoder component 120 of FIG. 2. The representative transformer encoder 302 includes one or more window-based encoders (304, . . . , 306). Each window-based encoder, in turn, includes a windowed encoder followed by a shift-windowed encoder. For example, the first window-based encoder 304 includes a windowed encoder 308 followed by a shift-windowed encoder 310, while the Kth window-based encoder 306 includes a windowed encoder 312 followed by a shift-windowed encoder 314. Further detail regarding the operation of these two types of subcomponents will be described below with reference to FIGS. 5-8.

Figure 4:
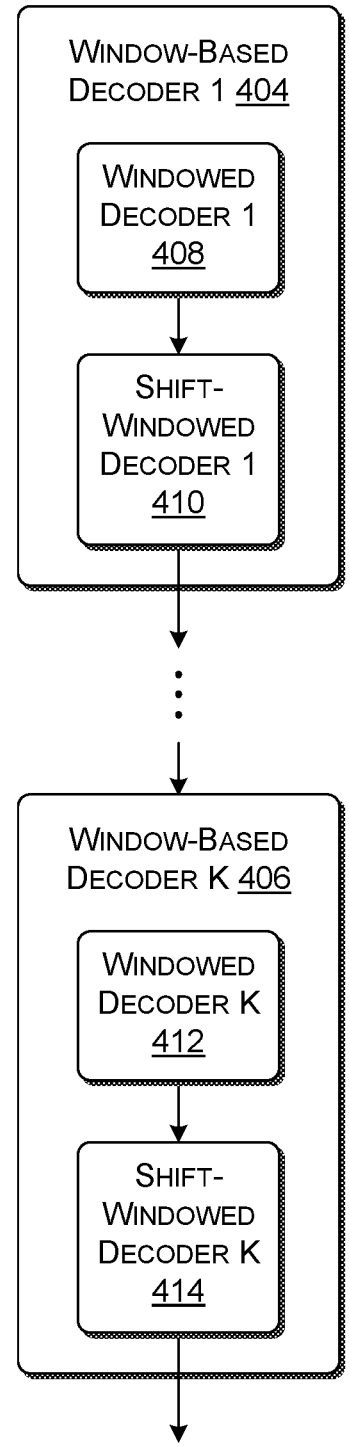
FIG. 4 shows a representative transformer decoder for use in the encoder-decoder component of FIG. 2.

FIG. 4 shows a representative transformer decoder 402 for use in the transformer-based encoder-decoder component 120 of FIG. 2. The representative transformer decoder 402 includes one more window-based decoders (404, . . . , 406). Each window-based decoder, in turn, includes a windowed decoder followed by a shift-windowed decoder. For example, the first window-based decoder 404 includes a windowed decoder 408 followed by a shift-windowed decoder 410, while the Kth window-based decoder 406 includes a windowed decoder 412 followed by a shift-windowed decoder 414. Further detail regarding the operation of these two types of subcomponents will be described below with reference to FIG. 9.

Figure 5:
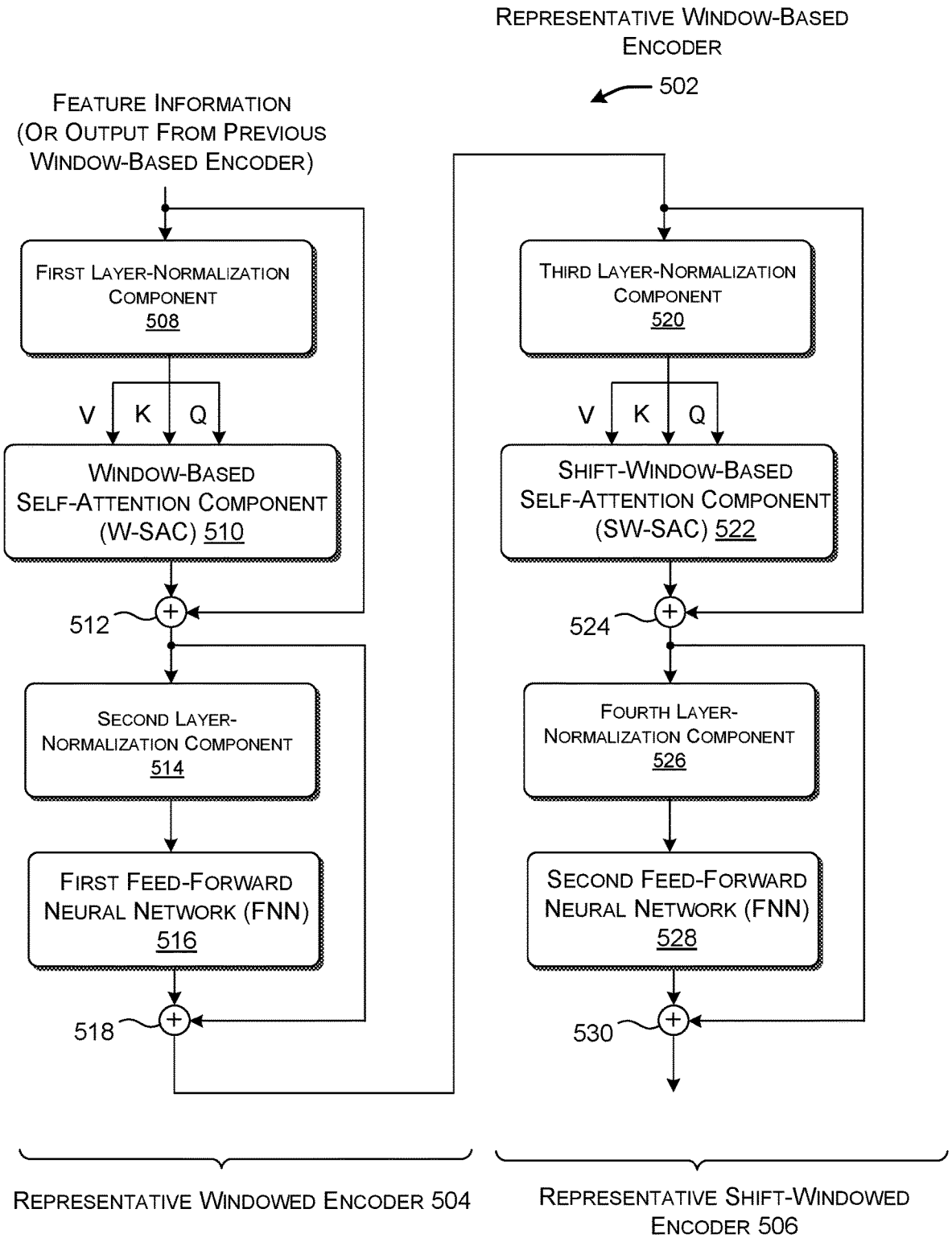
FIG. 5 shows a representative window-based encoder for use in the transformer encoder of FIG. 3.

FIG. 5 shows a representative window-based encoder 502 for use in any one of the window-based encoders of FIG. 3. The window-based encoder 502 includes a windowed encoder 504 followed by a shift-windowed encoder 506. The window-based encoder 502 will be explained with reference to the example presented in FIGS. 6-8.

Beginning with the windowed encoder 504, this component receives input information that includes either the block of feature information 116 provided by the feature-extracting component 114 or the output information generated by an immediately preceding window-based encoder (not shown in FIG. 5). A first layer-normalization component 508 normalizes the input information by adjusting it values based on the mean and standard deviation of those values.

A window-based self-attention component (W-SAC) 510 receives input information supplied by the layer-normalization component 508. Assume that the input information has a size of W×H×C (where, again, C refers to the number of features provided by the feature-extracting component 114). The W-SAC 510 partitions this input information into a plurality of windows of size M×M×C. Note that each window expresses information that derives from a portion of all four input video frames of the input video information 104. The W-SAC 510 then separately performs a self-attention operation for each window. That is, for each particular window, the W-SAC 510 determines the importance of each image element in the particular window with respect to each other image element in the particular window. As noted above, this operation reveals intra-frame relations among image elements in a single video frame, and inter-frame relations among image elements in different video frames.

More specifically, in one implementation, the W-SAC 510 can perform self-attention for a particular window using the following equation:

$$attn(Q, K, V) = \text{softmax}\left(\frac{QK^T}{\sqrt{d}} + B\right)V. \quad (1)$$

The W-SAC 510 produces query information Q by multiplying input vectors associated with image elements in the particular window by a query weighting matrix $W^Q$. The W-SAC 510 produces key information K and value information V by multiplying the same input vectors by a key weighting matrix $W^K$ and a value weighting matrix WV, respectively. To execute Equation (2), the W-SAC 510 takes the dot product of Q with the transpose of K, and then divides that dot product by a scaling factor √d; the symbol d represents the dimensionality of the machine-learned model that implements the W-SAC 510. The W-SAC 510 adds a position matrix B to the result of the division, and the takes the softmax (normalized exponential function) of the resultant sum. The position matrix B expresses the position of each image element in the window with respect to every other image element in the window. The W-SAC 510 multiples the result of the softmax operation by V. Background information regarding the general concept of attention is provided in VASWANI, et al., "Attention Is All You Need," in 31st Conference on Neural Information Processing Systems (NIPS 2017), 2017, 11 pages.

A residual connection 512 combines (e.g., sums) the output provided by the W-SAC 510 with the input information fed to the first layer-normalization component 508. The windowed encoder 504 next processes the output information provided the residual connection 512 using, in order, a second layer-normalization component 514, a feed-forward neural network (FFN) 516, and a second residual connection 518. The FNN 516 can use any number of layers of neurons to transform input information into output information. For example, the FNN 516 may represent a fully-connected multi-layered perceptron (MLP).

The shift-windowed encoder 506 processes the output information provided by the windowed encoder 504 using, in order, a third layer-normalization component 520, a shift-window-based self-attention component (SW-SAC) 522, a third residual connection 524, a fourth layer-normalization component 526, a second FNN 528, and a fourth residual connection 530. These components perform the same tasks as their counterparts in the windowed encoder 504.

Unlike the W-SAC 510, however, the SW-SAC 522 performs a window-shifting operation. More specifically, like the W-SAC 510, the SW-SAC 522 partitions input information into a plurality of windows. The SW-SAC 522 then shifts this collection of windows a prescribed amount, e.g., by shifting the collection of windows to the left by a distance of M/2, and upward by a distance of M/2. This shifting operation changes the image elements encompassed by each of the windows. The SW-SAC 522 then computes attention information for the windows using Equation (1) in the manner described above. More generally, the SW-SAC 522 performs this shifting operation to capture dependencies among image elements not previously detected by the W-SAC 510. That is, since the W-SAC 510 performs siloed window-based analysis, the W-SAC 510 does not discover relations across windows. The SW-SAC 522 addresses this deficiency by shifting the windows and repeating the same self-attention operations performed by the W-SAC 510.

Figure 6:
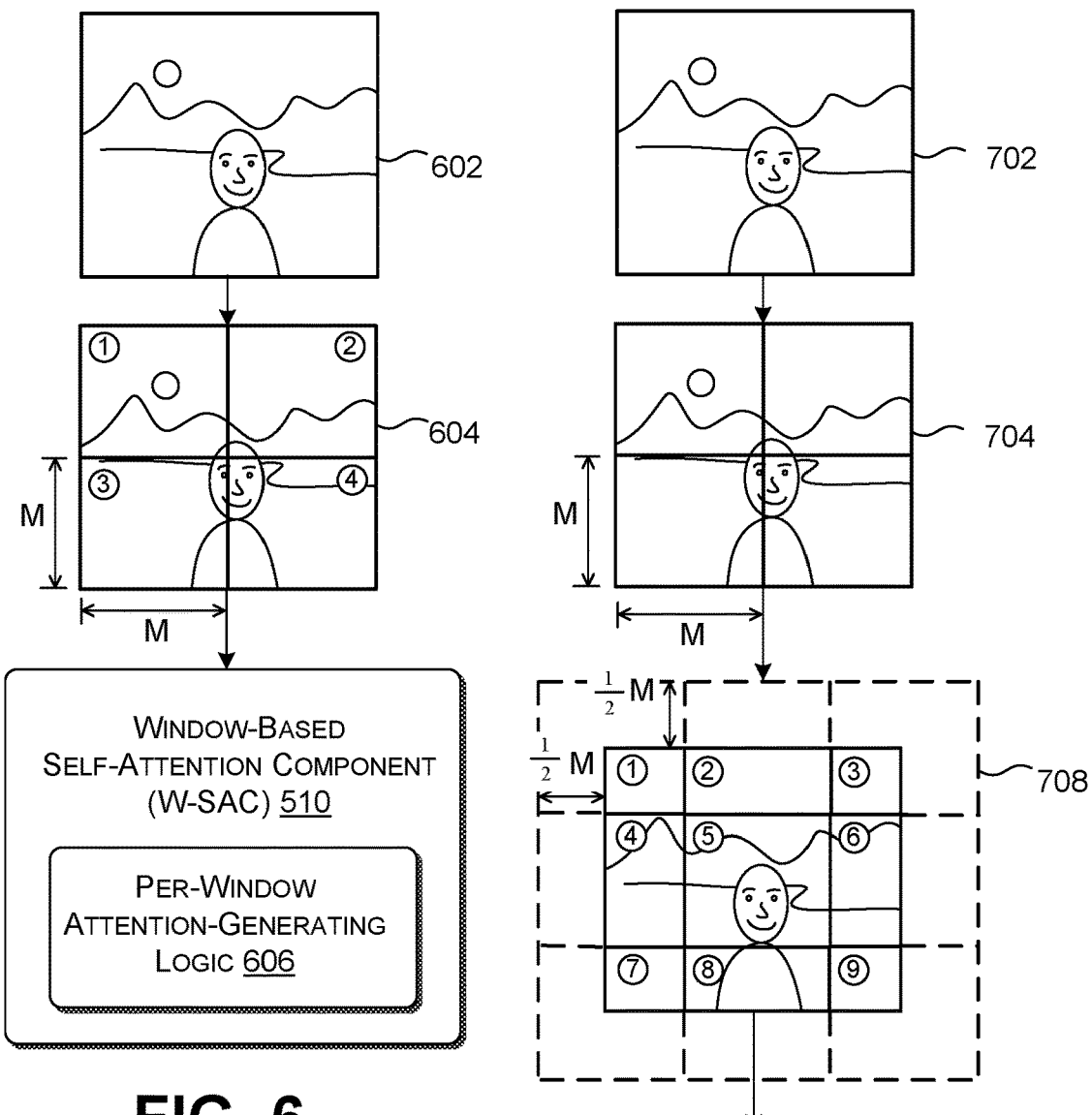
FIG. 6 shows an example of the operation of a window-based self-attention component (W-SAC) for use in the window-based encoder of FIG. 5.

FIG. 6 shows an example of the operation of the W-SAC 510 of the windowed encoder 504. Assume that the W-SAC 510 receives input information that represents four video frames that show a subject in an outdoor scene. A video frame 602 represents one such video frame. The W-SAC 510 partitions the input information into a plurality of M×M windows. In the simplified example of FIG. 6, the W-SAC 510 partitions the input information into four windows (such as representative window 604), but other implementations of the W-SAC 510 can produce a larger number of windows than show in FIG. 6. Further note that FIG. 6 represents each window as a two-dimensional tile, but each window also has a depth of C features (e.g., where C may equal 96). Further note that the C features capture information across the four video frames. The W-SAC 510 then uses attention-generating logic 606 to generate attention information for each of the four windows, e.g., using Equation (1).

Figure 7:
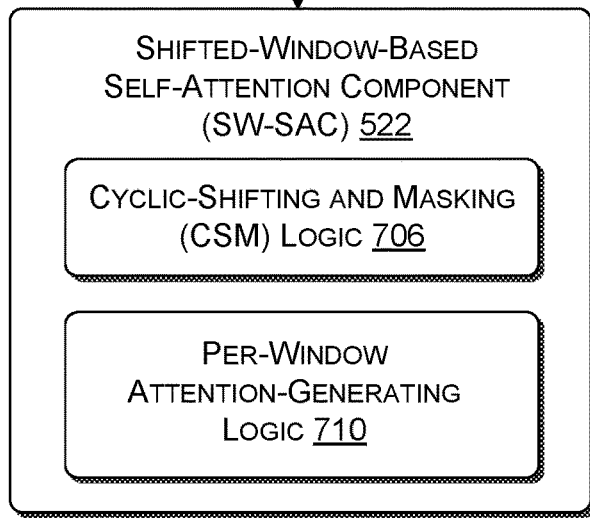
FIG. 7 shows an example of the operation of a shift-window-based self-attention component (SW-SAC) for use in the window-based encoder of FIG. 5.

FIG. 7 shows an example of the operation of the SW-SAC 522 of the shift-windowed encoder 506. Again assume that the SW-SAC 522 receives input information that represents four video frames that show a subject in an outdoor scene. A video frame 702 represents one such video frame. As before, the SW-SAC 522 partitions the input information into a plurality of M×M windows, including representative window 704. The SW-SAC 522 then shifts this collection of windows a prescribed amount, e.g., by shifting the collection of windows to the left by a distance of M/2, and upward by a distance of M/2. The SW-SAC 522 then uses per-window attention-generating logic 706 to generate attention information for each of the newly-formed windows.

Figure 8:
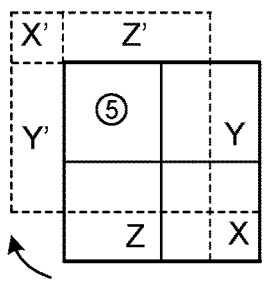
FIG. 8 shows an example of one technique by which the SW-SAC of FIG. 5 can perform a window-shifting operation.

In one technique, the SW-SAC 522 produces nine windows as a result of the shifting operation, including a representative new window 708. The SW-SAC 522 can pad entries in the windows with dummy values to mark parts of the windows that do not contain image elements. In another more efficient technique, the SW-SAC 522 can use cyclic-shifting and masking (CSM) logic 710 to shift the windows. As shown in FIG. 8, the CSM logic 710 cyclically shifts the windows upward and toward the left as described above. After the shift, new information (X', Y', Z') that is encompassed by the windows at their shifted positions is the mirrored duplicate of information (X, Y, Z) that was previously encompassed by the windows in their original positions. The CSM logic 710 then produces masks to ensure that the analysis performed by the attention-generating logic 706 does not compare image elements across different windows. Overall, the above-described cyclic shifting strategy avoids the need to create and process an expanded number of windows, as does the first technique. The cyclic shifting strategy also avoids the need to pad windows with dummy values, as does the first technique. Background information regarding the general topic of window shifting operations is provided in LIU, et al., "Swin Transformer: Hierarchical Vision Transformer Using Shifted Windows," in Proceedings of the IEEE/CVF International Conference on Computer Vision (ICCV), October 2021, 11 pages.

Figure 9:
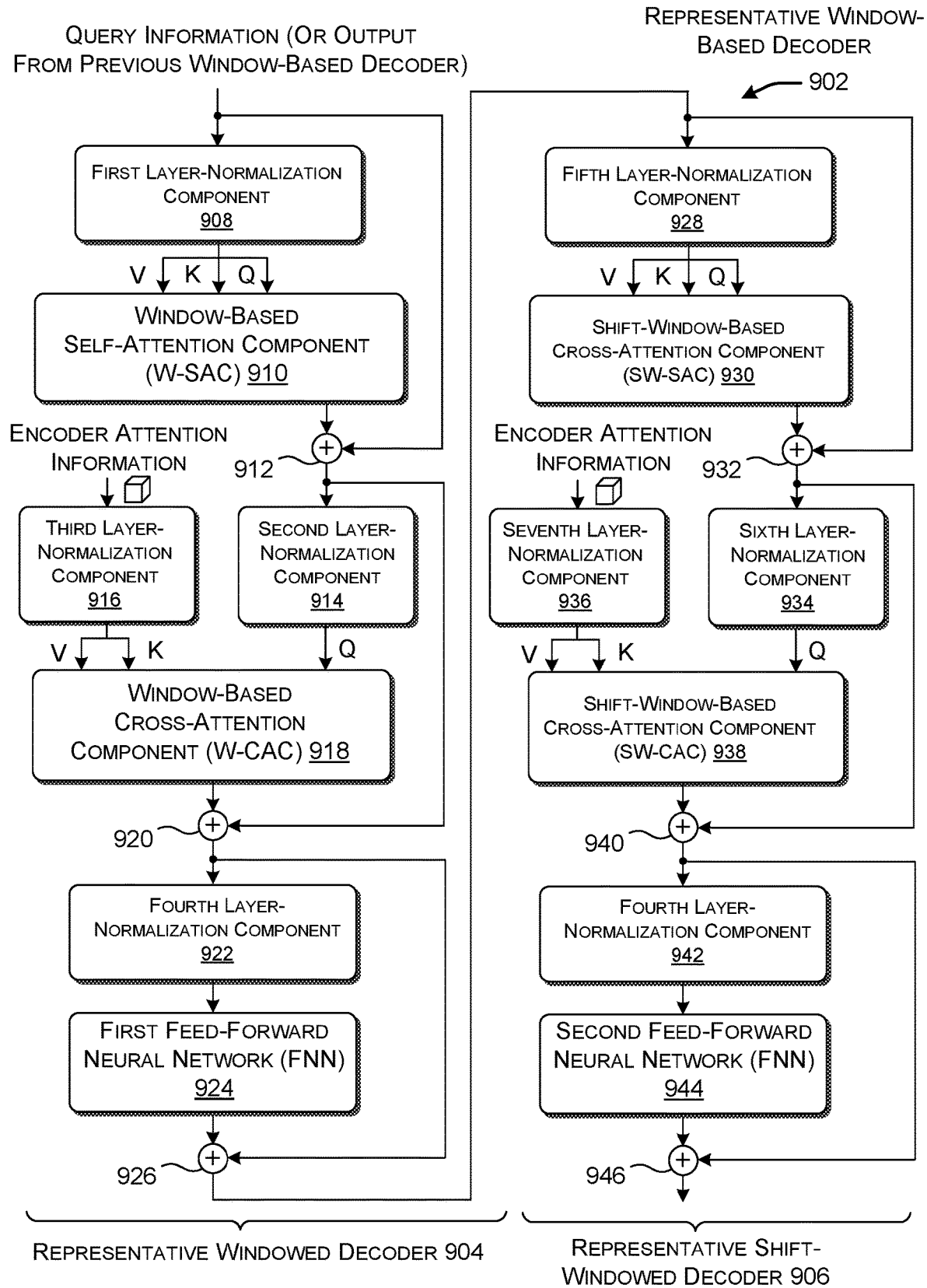
FIG. 9 shows a representative window-based decoder for use in the representative transformer decoder of FIG. 4.

FIG. 9 shows one implementation of a representative window-based decoder 902. The window-based decoder 902 is made up of a widowed decoder 904 and a shift-windowed decoder 906. The window-based decoder 902 includes the same kinds of processing components as the window-based encoder 502 of FIG. 5. These components generally perform the same functions as set forth above with respect to FIGS. 5-8. Note, however, that the window-based decoder 902 includes components that perform a cross-attention operation (which was not previously described), in addition to components that perform a self-attention operation (which was previously described).

More specifically, a first layer-normalization component 908 receives input information from the query or from the decoder output information provided by a preceding window-based decoder (not shown). A window-based self-attention component (W-SAC) 910 uses Equation (1) to perform self-attention on the output information generated by the first layer-normalization component 908. A residual connection 912 combines output information generated by the W-SAC 910 with the input information that is fed to the first layer-normalization component 908.

A second layer-normalization component 914 normalizes the output information provided by the first residual connection. A third layer-normalization component 916 normalizes encoder attention information provided by a corresponding encoder component (not shown in FIG. 9). A window-based cross-attention component (W-CAC) 918 then performs a cross-attention operation using Equation (1). In this case, however, the query information Q ultimately derives from the input information fed to the window-based decoder 902, while the key information K and value information V derive form the encoder attention information received from the corresponding encoder component. In other words, the cross-attention operation is different than the self-attention operation because, in the case of cross-attention, all of the input information used to compute attention using Equation (1) does not originate from the same source.

A second residual connection 920 combines the output information generated by the W-CAC 918 with the input information fed to the second normalization component 914. The windowed encoder 904 processes the output of the second residual connection 920 using, in order, a fourth layer-normalization component 922, a first feed-forward neural network (FNN) 924, and a third residual connection 926.

The shift-windowed decoder 906 contains the same architecture as the windowed decoder 904, but uses shift-window counterparts of the attention operations performed by the windowed decoder 904. That is, the shift-windowed decoder 906 includes: a fifth layer-normalization component 928, a shift-window-based cross-attention component (SW-SAC) 930 (which is the shift-window counterpart of the W-SAC 910), a fourth residual connection 932, a sixth and seventh layer-normalization components (934, 936), a shift-window-based cross-attention component (SW-SAC) 938 (which is the shift-window counterpart of the W-CAC 918), a fifth residual connection 940, an eight layer-normalization component 942, a second FNN 944, and a sixth-residual connection 946.

Different implementations of the interpolating system 102 were built with different numbers (K) of window-based encoders and window-based decoders in the transformer encoder 302 and the transformer decoder 402, respectively. That is, a model-S (small) was built with K=2 encoders/decoders, a model-M (medium) was built with K=3 encoders/decoders, and a model-L (large) was built with K=4 encoders/decoders. The characteristics and performance of these three versions of the interpolating system 102 was then compared to three other STVSR approaches by others. A first approach (TMNet) is described in XU, et al., "Temporal Modulation Network for Controllable Space-Time Video Super-Resolution," in 2021 IEEE/CVF Conference on Computer Vision and Pattern Recognition (CVPR), June 2021, 10 pages. A second approach (ZSM) is described in XIANG, et al., "Zooming Slow-Mo: Fast and Accurate One-Stage Space-Time Video Super-Resolution," in 2020 IEEE/CVF Conference on Computer Vision and Pattern Recognition (CVPR), June 2020, 10 pages. A third approach (STARnet) is described in HARIS, et al., "Space-Time-Aware Multi-Resolution Video Enhancement," in 2020 IEEE/CVF Conference on Computer Vision and Pattern Recognition (CVPR), June 2020, 10 pages.

FIG. 10 shows the speed-related performance of the model-S, model-M, and model-L relative to the competing approaches, measured in terms of frames-per-second (FPS). FIG. 10 also compares the speed of the models with respect to a threshold of 24 FPS, which is a standard cinematic rate. FIG. 11 shows the sizes of the model-S, model-M, and model-L relative to competing approaches, measured in terms of the number of parameters used by the different approaches (in millions). These figures generally reveal that the interpolating system 102 described herein is significantly smaller and faster than the state-of-the-art competing STVSR methods while maintaining similar or better performance. For example, the model-L performs similarly to TMNet with 40% fewer parameters, model-M outperforms ZSM with 50% fewer parameters, and model-S outperforms STARNet with 96% fewer parameters. Model-S achieves a frame rate of more than 24 FPS, (the standard cinematic frame rate) operating on 720×576 frames. Model-S achieves the performance of ZSM with a 75% speedup, and outperforms STARNet with about 700% speedup. Therefore, the model-S is the only approach of those compared that enjoys a real-time inference speed.

The interpolating system 102 uses fewer parameters (and thus uses less memory and processing resources) compared to competing resources because it uses the same components of its architecture to simultaneously and jointly perform both temporal and spatial interpolation. "Joint" means "united" or "combined" as used herein. For example, each encoding component provides insight across both the spatial and temporal dimensions in the course of generating encoder attention information. A counterpart decoder component relies on this encoder attention information in decoding the query 130. Other approaches, by contrast, dedicate particular functionality to performing temporal interpolation and other functionality to performing spatial resolution, without sharing insights between these two instances of functionality. The interpolating system 102 can also use a computationally light feature-extracting component 114 and reconstruction component 134 (if used at at), compared to competing approaches.

Note that the interpolating system 102 has been described above in the context of a transformer-based architecture. Other implementations of the interpolating systems 102 can use other types of machine-trained components to perform unified space-time interpolation, such as recurrent neural networks (RNN), convolutional neural networks (CNN), feed-forward neural networks (FNN), etc., or any combination thereof. The tasks that the interpolating system 102 can perform, regardless of the kind(s) of machine-trained components used include: (a) forming feature information that describes image elements across a plurality of video frames; (b) analyzing the feature information in a pipeline of encoding stages, to generate insight regarding the relations among image elements in both the spatial and temporal dimensions; and (c) building a set of video frames in a pipeline of decoding stages with reference to the information generated in the encoding stages, to produce output video information.

In addition, or alternatively, the N-stage encoding component 122 is a one-stage encoding component and the N-stage decoding component 132 is a one-stage decoding component. The one-stage decoding component operates on encoder attention information generated by the query-generating component 128 and the one-stage encoding component.

B. Illustrative Processes

FIGS. 12-14 show processes that explain the operation of the interpolating system 102 of Section A in flowchart form, according to some implementations. Since the principles underlying the operation of the interpolating system 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In some implementations, the blocks shown in the flowcharts that pertain to processing-related functions are implemented by the hardware logic circuitry described in Section C, which, in turn, can be implemented by one or more hardware processors and/or other logic units that include a task-specific collection of logic gates.

FIG. 12 shows a process 1202 for performing an interpolation operation. In block 1204, the interpolating system 102 obtains input video information having a given first number of plural frames, each frame in the input video information 104 having a given first spatial resolution. In block 1206, the feature-extracting component 114 generates feature information 116 based on the input video information 104. In block 1208, the interpolating system 102 produces output video information 106 based on the feature information 116 using a transformer-based encoding operation, followed by a query-generating operation, followed by a transformer-based decoding operation. The transformer-based decoding operation is performed based on encoder attention information produced by the transformer-based encoding operation. The encoder attention information expresses identified relations across the plural frames of the input video information 104. The output video information 106 has a second number of frames that is higher than the first number of frames in the input video information 104 and has a second spatial resolution that is higher than the first spatial resolution of the input video information 104.

FIGS. 13 and 14 show another process 1302 performed by the interpolating system 102 for interpolating video information. In block 1304, the interpolating system obtains input video information 104 having a given first number of plural frames, each frame in the input video information 104 having a given first spatial resolution. In block 1306, the feature-extracting component 114 generates feature information 116 based the input video information 104. In block 1308, the N-stage encoding component 122 encodes the feature information 116 in a pipeline having plural encoding stages that operate at different respective resolutions, to produce plural instances of encoder attention information and plural instances of encoder output information. Each instance of the encoder attention information expresses identified relations across the plural frames of the input video information 104. In block 1310, the query-generating component 128 produces a query 130 based on an instance of encoder output information produced by a last encoding stage of the plural encoding stages. In block 1312, the N-stage decoding component 132 decodes the query 130 in a pipeline having plural decoding stages that operate at different respective resolutions, to produce plural instances of decoder output information. Each decoding stage that has a preceding decoding stage receives an instance of decoding input information produced by the preceding decoding stage. Further, each particular decoding stage operates on an instance of encoder attention information produced by a particular encoding stage that has a same resolution level as the particular decoding stage. In block 1402 of FIG. 14, the interpolating system 102 produces output video information 106 based on decoder output information produced by a last decoding stage of the plural decoding stages. The output video information 106 has a second number of frames that is higher than the first number of frames in the input video information 104, and has a second spatial resolution that is higher than the first spatial resolution of the input video information 104.

C. Representative Computing Functionality

FIG. 15 shows an example of computing equipment that can be used to implement any of the systems summarized above. The computing equipment includes a set of user computing devices 1502 coupled to a set of servers 1504 via a computer network 1506. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1506 can be implemented as a local area network, a wide area network (e.g., the Internet), one or more point-to-point links, or any combination thereof.

FIG. 15 also indicates that the interpolating system 102 and the training component system 140 can be spread across the user computing devices 1502 and/or the servers 1504 in any manner. For instance, in some cases, the interpolating system 102 is entirely implemented by one or more of the servers 1504. Each user may interact with the servers 1504 via a user computing device. In other cases, the interpolating system 102 is entirely implemented by a user computing device in local fashion, in which case no interaction with the servers 1504 is necessary. In another case, the functionality associated with the interpolating system 102 is distributed between the servers 1504 and each user computing device in any manner.

Figure 16:
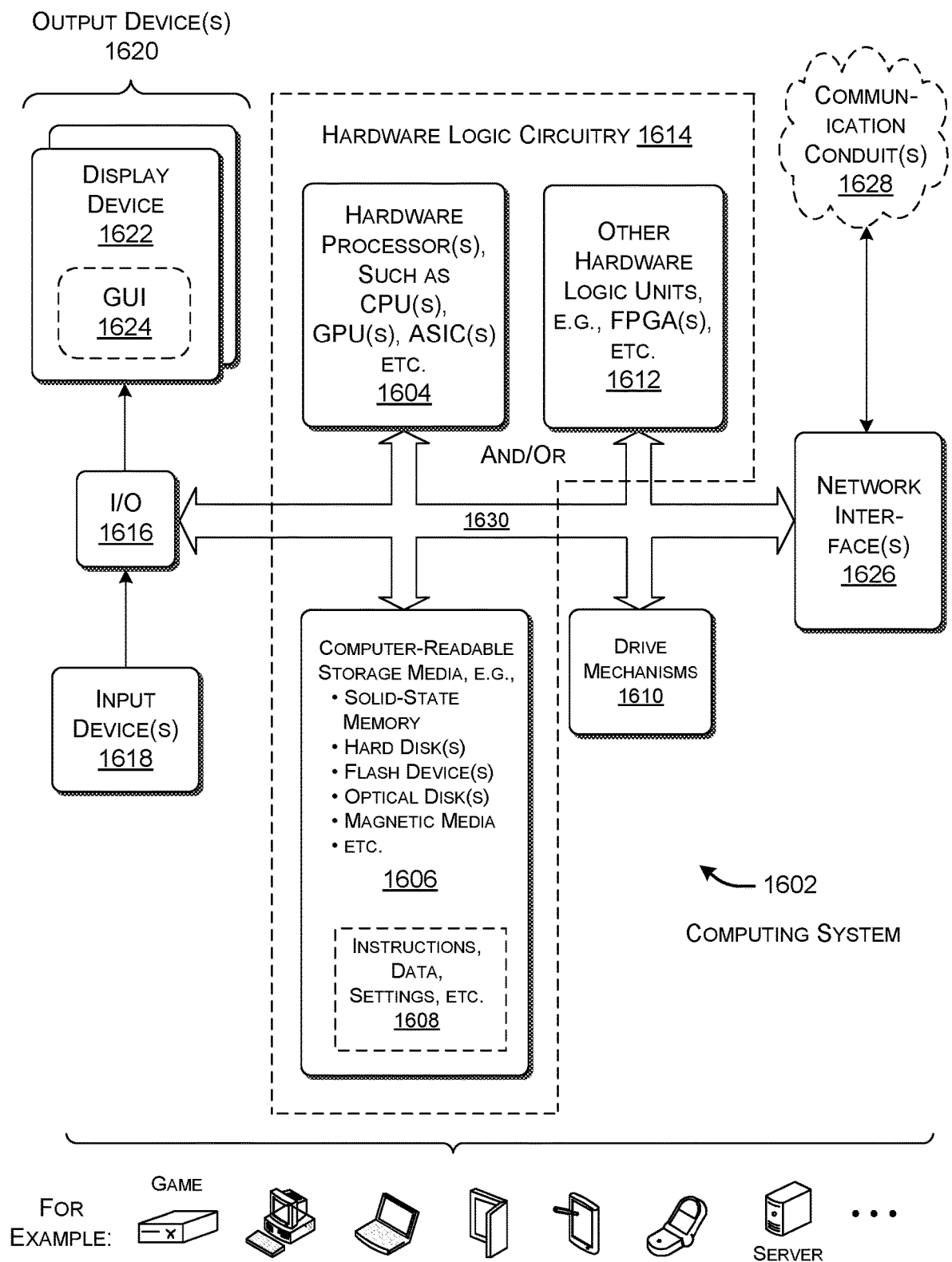
FIG. 16 shows an illustrative type of computing system that can be used to implement any aspect of the features shown in the foregoing drawings.

FIG. 16 shows a computing system 1602 that can be used to implement any aspect of the mechanisms set forth in the above-described figures. For instance, the type of computing system 1602 shown in FIG. 16 can be used to implement any user computing device or any server shown in FIG. 15. In all cases, the computing system 1602 represents a physical and tangible processing mechanism.

The computing system 1602 can include one or more hardware processors 1604. The hardware processor(s) 1604 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1602 can also include computer-readable storage media 1606, corresponding to one or more computer-readable media hardware units. The computer-readable storage media 1606 retains any kind of information 1608, such as machine-readable instructions, settings, data, etc. Without limitation, the computer-readable storage media 1606 may include one or more solid-state devices, one or more magnetic hard disks, one or more optical disks, magnetic tape, and so on. Any instance of the computer-readable storage media 1606 can use any technology for storing and retrieving information. Further, any instance of the computer-readable storage media 1606 may represent a fixed or removable unit of the computing system 1602. Further, any instance of the computer-readable storage media 1606 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1602 can utilize any instance of the computer-readable storage media 1606 in different ways. For example, any instance of the computer-readable storage media 1606 may represent a hardware memory unit (such as Random Access Memory (RAM)) for storing information during execution of a program by the computing system 1602, and/or a hardware storage unit (such as a hard disk) for retaining/archiving information on a more permanent basis. In the latter case, the computing system 1602 also includes one or more drive mechanisms 1610 (such as a hard drive mechanism) for storing and retrieving information from an instance of the computer-readable storage media 1606.

The computing system 1602 may perform any of the functions described above when the hardware processor(s) 1604 carry out computer-readable instructions stored in any instance of the computer-readable storage media 1606. For instance, the computing system 1602 may carry out computer-readable instructions to perform each block of the processes described in Section B.

Alternatively, or in addition, the computing system 1602 may rely on one or more other hardware logic units 1616 to perform operations using a task-specific collection of logic gates. For instance, the hardware logic unit(s) 1612 may include a fixed configuration of hardware logic gates, e.g., that are created and set at the time of manufacture, and thereafter unalterable. Alternatively, or in addition, the other hardware logic unit(s) 1612 may include a collection of programmable hardware logic gates that can be set to perform different application-specific tasks. The latter class of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 16 generally indicates that hardware logic circuitry 1614 includes any combination of the hardware processor(s) 1604, the computer-readable storage media 1606, and/or the other hardware logic unit(s) 1612. That is, the computing system 1602 can employ any combination of the hardware processor(s) 1604 that execute machine-readable instructions provided in the computer-readable storage media 1606, and/or one or more other hardware logic unit(s) 1612 that perform operations using a fixed and/or programmable collection of hardware logic gates. More generally stated, the hardware logic circuitry 1614 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1614 that performs a particular function or combination of functions.

In some cases (e.g., in the case in which the computing system 1602 represents a user computing device), the computing system 1602 also includes an input/output interface 1616 for receiving various inputs (via input devices 1618), and for providing various outputs (via output devices 1620). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1622 and an associated graphical user interface presentation (GUI) 1624. The display device 1622 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1602 can also include one or more network interfaces 1626 for exchanging data with other devices via one or more communication conduits 1628. One or more communication buses 1630 communicatively couple the above-described units together.

The communication conduit(s) 1628 can be implemented in any manner, e.g., by a local area computer network, a wide area computer network (e.g., the Internet), point-to-point connections, etc., or any combination thereof. The communication conduit(s) 1628 can include any combination of hardwired links, wireless links, routers, gateway functionality, name servers, etc., governed by any protocol or combination of protocols.

FIG. 16 shows the computing system 1602 as being composed of a discrete collection of separate units. In some cases, the collection of units corresponds to discrete hardware units provided in a computing device chassis having any form factor. FIG. 16 shows illustrative form factors in its bottom portion. In other cases, the computing system 1602 can include a hardware logic unit that integrates the functions of two or more of the units shown in FIG. 1. For instance, the computing system 1602 can include a system on a chip (SoC or SOC), corresponding to an integrated circuit that combines the functions of two or more of the units shown in FIG. 16.

The following summary provides a non-exhaustive set of illustrative examples of the technology set forth herein.

(A1) According to a first aspect, some implementations of the technology described herein include a method (e.g., the process 1302) for performing an interpolation operation. The method includes: obtaining (e.g., in block 1304) input video information (e.g., 104) having a given first number of plural frames, each frame in the input video information having a given first spatial resolution; generating (e.g., 1306) feature information (e.g., 116) based the input video information; and encoding (e.g., 1308) the feature information in a pipeline having plural encoding stages that operate at different respective resolutions, to produce plural instances of encoder attention information and plural instances of encoder output information, each instance of the encoder attention information expressing identified relations across the plural frames of the input video information. The method then includes producing (e.g., 1310) a query (e.g., 130) based on an instance of encoder output information produced by a last encoding stage of the plural encoding stages. The method then includes decoding (e.g., 1312) the query in a pipeline having plural decoding stages that operate at different respective resolutions, to produce plural instances of decoder output information. Each decoding stage that has a preceding decoding stage receives an instance of decoding input information produced by the preceding decoding stage. Further, each particular decoding stage operates on an instance of encoder attention information produced by a particular encoding stage that has a same resolution level as the particular decoding stage. The method then includes producing (e.g., 1402) output video information (e.g., 106) based on decoder output information produced by a last decoding stage of the plural decoding stages. The output video information has a second number of frames that is higher than the first number of frames in the input video information, and has a second spatial resolution that is higher than the first spatial resolution of the input video information. The method is technically advantageous because it uses a model that is more compact than competing interpolating systems, and because it runs faster than competing interpolating systems.

(A2) According to some implementations of the method of A1, each given stage in the pipeline of encoding stages and the pipeline of decoding stages produces a particular instance of attention information using a transformer-based neural network.

(A3) According to some implementations of the method of A2, the transformer-based neural network performs a first kind of attention operation that involves generating window-specific attention information for individual windows within input information that is fed to the first kind of attention operation.

(A4) According to some implementations of the method of A3, the transformer-based neural network also performs a second kind of attention operation that involves generating window-specific attention information for individual windows within input information that is fed to the second kind of attention operation, the individual windows in the second kind of attention operation being shifted relative to the individual windows in the first kind of attention operation.

(A5) According to some implementations of any of the methods of A2-A4, the given stage is a given encoding stage, and wherein the given encoding stage also performs a down-sampling operation on the particular instance of attention information.

(A6) According to some implementations of any of the methods of A2-A5, the given stage is a given encoding stage, and the particular instance of attention information includes key information and value information that is generated based on feature information obtained from the plural frames of the input video information.

(A7) According to some implementations of the method of A2, the given stage is a given decoding stage, and the given decoding stage also performs an up-sampling operation on the particular instance of attention information.

(A8) According to some implementations of any of the methods of A1-A7, the operation of producing a query involves producing encoder output information for at least one added frame that is not present in the input video information.

(A9) According to some implementations of the method of A8, the operation of producing a query produces the encoder output information for the aforementioned at least one added frame based on the encoder output information produced by the last encoding stage for frames in the input video information that temporally precede and follow the added frame.

(A10) According to some implementations of any of the methods of A1-A9, the operation of producing the output video information includes: interpolating the input video information to produce interpolated video information; and combining the decoder output information produced by the last decoding stage with the interpolated video information.

(A11) According to some implementations of the method of A10, the operation of producing the video output information includes performing a reconstruction operation on the decoder output information produced by the last decoding stage prior to said combining.

(B1) According to another illustrative aspect, another method (e.g., the process 1202) is described for interpolating video information. The method includes: obtaining (e.g., 1204) input video information (e.g., 104) having a given first number of plural frames, each frame in the input video information having a given first spatial resolution; generating (e.g., 1206) feature information (e.g., 116) based on the input video information; and producing (e.g., 1208) output video information (e.g., 106) based on the feature information using a transformer-based encoding operation, followed by a query-generating operation, followed by a transformer-based decoding operation. The transformer-based decoding operation is performed based on encoder attention information produced by the transformer-based encoding operation. The encoder attention information expresses identified relations across the plural frames of the input video information. The output video information has a second number of frames that is higher than the first number of frames in the input video information, and has a second spatial resolution that is higher than the first spatial resolution of the input video information. The method is technically advantageous because it uses a model that is more compact than competing interpolating systems, and because it runs faster than competing interpolating systems.

(B2) According to some implementations of the method of B1, the transformer-based encoding operation includes a pipeline having plural encoding stages that operate at different respective resolutions, and that produce plural instances of encoder attention information and plural instances of encoder output information. Each instance of the encoder attention information expresses identified relations across the plural frames of the input video information. The transformer-based decoding operation includes a pipeline having plural decoding stages that operate at different respective resolutions, and that produce plural instances of decoder output information. Each decoding stage that has a preceding decoding stage receives an instance of decoder input information produced by the preceding decoding stage. And each particular decoding stage operates on an instance of encoder attention information produced by a particular encoding stage that has a same resolution level as the particular decoding stage.

(B3) According to some implementations of the method of B2, a given encoding stage performs at least one kind of attention operation and a down-sampling operation.

(B4) According to some implementations of the method of B2, a given decoding stage performs at least one kind of attention operation and an up-sampling operation.

(B5) According to some implementations of the method of B2, the query-generating operation produces a query based on encoder output information produced by a last encoding stage of the plural encoding stages. The decoder input information fed to a first decoding stage in the plural decoding stages is the query.

In yet another aspect, some implementations of the technology described herein include a computing system (e.g., computing system 1602). The computing system includes hardware logic circuitry (e.g., 1614) that is configured to perform any of the methods described herein (e.g., any of the methods of A1-A11 and B1-B5).

In yet another aspect, some implementations of the technology described herein include a computer-readable storage medium (e.g., the computer-readable storage media 1606) for storing computer-readable instructions (e.g., 1608). The computer-readable instructions, when executed by one or more hardware processors (e.g., 1604), perform any of the methods described herein (e.g., any of the methods of A1-A11 and B1-B5).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1614 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for interpolating video information, comprising:
    obtaining input video information having a given first number of plural frames, each frame in the input video information having a given first spatial resolution;
    generating feature information based the input video information;
    encoding the feature information in a pipeline having plural encoding stages that operate at different respective resolutions, to produce plural instances of encoder attention information and plural instances of encoder output information, each instance of the encoder attention information expressing identified relations across the plural frames of the input video information;

producing a query based on an instance of encoder output information produced by a last encoding stage of the plural encoding stages;
decoding the query in a pipeline having plural decoding stages that operate at different respective resolutions, to produce plural instances of decoder output information, each decoding stage that has a preceding decoding stage receiving an instance of decoding input information produced by the preceding decoding stage, and each particular decoding stage operating on an instance of encoder attention information produced by a particular encoding stage that has a same resolution level as the particular decoding stage; and
producing output video information based on decoder output information produced by a last decoding stage of the plural decoding stages,
said producing including:
performing a reconstruction operation on the decoder output information produced by the last decoding stage, to produce reconstructed information;
interpolating the input video information to produce interpolated video information; and
combining the reconstructed information with the interpolated video information to produce the output video information,
the output video information having a second number of frames that is higher than the first number of frames in the input video information, and having a second spatial resolution that is higher than the first spatial resolution of the input video information.

2. The method of claim 1, wherein each given stage in the pipeline of encoding stages and the pipeline of decoding stages produces a particular instance of attention information using a transformer-based neural network.

3. The method of claim 2, wherein the transformer-based neural network performs a first kind of attention operation that involves partitioning first-attention-operation input information into individual windows, and generating window-specific attention information for the individual windows.

4. The method of claim 3, wherein the transformer-based neural network also performs a second kind of attention operation that involves partitioning second-attention-operation input information into individual windows, and generating window-specific attention information for the individual windows produced by the second kind of attention operation, the individual windows in the second kind of attention operation being shifted relative to the individual windows in the first kind of attention operation.

5. The method of claim 2, wherein the given stage is a given encoding stage, and wherein the given encoding stage also performs a down-sampling operation on the particular instance of attention information.

6. The method of claim 2, wherein the given stage is a given encoding stage, and wherein the particular instance of attention information includes key information and value information that is generated based on feature information obtained from the plural frames of the input video information.

7. The method of claim 2, wherein the given stage is a given decoding stage, and wherein the given decoding stage also performs an up-sampling operation on the particular instance of attention information.

8. The method of claim 1, wherein said producing a query involves producing encoder output information for at least one added frame that is not present in the input video information.

9. The method of claim 8, wherein said producing a query produces the encoder output information for said at least one added frame based on the encoder output information produced by the last encoding stage for frames in the input video information that temporally precede and follow the added frame.

10. A computing system for performing an interpolation operation, comprising:
a memory for storing machine-readable instruction;
a processor that performs operations by executing the machine-readable instructions stored in the memory, the operations including:
obtaining input video information having a given first number of plural frames, each frame in the input video information having a given first spatial resolution;
generating feature information based on the input video information; and
producing output video information based on the feature information using a transformer-based encoding operation, followed by a query-generating operation, followed by a transformer-based decoding operation, followed by an interpolating operation, the transformer-based decoding operation being performed based on encoder attention information produced by the transformer-based encoding operation,
the encoder attention information expressing identified relations across the plural frames of the input video information,
the output video information having a second number of frames that is higher than the first number of frames in the input video information, and having a second spatial resolution that is higher than the first spatial resolution of the input video information,
wherein the transformer-based encoding operation includes a pipeline having plural encoding stages that operate at different respective resolutions, and that produce plural instances of encoder attention information and plural instances of encoder output information,
each instance of the encoder attention information expressing identified relations across the plural frames of the input video information,
wherein the query-generating operation produces a query based on an instance of encoder output information produced by a last encoding stage of the plural encoding stages,
wherein the transformer-based decoding operation decodes the query using a pipeline having plural decoding stages that operate at different respective resolutions, and that produce plural instances of decoder output information, each decoding stage that has a preceding decoding stage receiving an instance of decoder input information produced by the preceding decoding stage, and each particular decoding stage operating on an instance of encoder attention information produced by a particular encoding stage that has a same resolution level as the particular decoding stage,
wherein the interpolating operation interpolates the input video information to produce interpolated video information, and wherein the operations further include combining decoder output information produced by a last decoding stage of the plural decoding stages with the interpolated video information to produce the output video information.

11. The computing system of claim 10, wherein a given encoding stage performs at least one kind of attention operation and a down-sampling operation.

12. The computing system of claim 10, wherein a given decoding stage performs at least one kind of attention operation and an up-sampling operation.

13. A non-transitory computer-readable storage medium for storing computer-readable instructions, the computer-readable instructions, when executed by one or more hardware processors, performing a method that comprises:
obtaining input video information having a given first number of plural frames, each frame in the input video information having a given first spatial resolution;
generating feature information based on the input video information; and
producing output video information based on the feature information using a transformer-based encoding operation, followed by a query-generating operation, followed by a transformer-based decoding operation, followed by an interpolating operation, the transformer-based decoding operation being performed based on encoder attention information produced by the transformer-based encoding operation,
the encoder attention information expressing identified relations across the plural frames of the input video information,
the output video information having a second number of frames that is higher than the first number of frames in the input video information, and having a second spatial resolution that is higher than the first spatial resolution of the input video information,
wherein the transformer-based encoding operation includes a pipeline having plural encoding stages that operate at different respective resolutions, and that produce plural instances of encoder attention information and plural instances of encoder output information,
each instance of the encoder attention information expressing identified relations across the plural frames of the input video information,
wherein the query-generating operation produces a query based on an instance of encoder output information produced by a last encoding stage of the plural encoding stages,
wherein the transformer-based decoding operation decodes the query using a pipeline having plural decoding stages that operate at different respective resolutions, and that produce plural instances of decoder output information, each decoding stage that has a preceding decoding stage receiving an instance of decoder input information produced by the preceding decoding stage, and each particular decoding stage operating on an instance of encoder attention information produced by a particular encoding stage that has a same resolution level as the particular decoding stage,
wherein the interpolating operation interpolates the input video information to produce interpolated video information, and wherein the operations further include combining decoder output information produced by a last decoding stage of the plural decoding stages with the interpolated video information to produce the output video information.

14. The non-transitory computer-readable storage medium of claim 13, wherein the pipeline of encoding stages operate using successively lower resolutions, and wherein the pipeline of decoding stages operate using successively higher resolutions.

15. The non-transitory computer-readable storage medium of claim 13, wherein each given encoding stage in the pipeline of encoding stages performs a first kind of attention operation that involves partitioning first-attention-operation input information into individual windows, and generating window-specific attention information for the individual windows,
each individual window for which the first kind of attention operation is performed being based on feature information obtained from the plural frames of the input video information.

16. The non-transitory computer-readable storage medium of claim 15, wherein the given encoding stage also performs at a second kind of attention operation that involves partitioning second-attention-operation input information into individual windows, and generating window-specific attention information for individual windows produced by the second kind of attention operation, the individual windows in the second kind of attention operation being shifted relative to the individual windows in the first kind of attention operation,
each individual window for which the second kind of attention operation is performed being based on feature information obtained from the plural frames of the input video information.

17. The non-transitory computer-readable storage medium of claim 13, further comprising:
performing a reconstruction operation on the decoder output information produced by the last decoding stage of the plural decoding stages, to produce reconstructed information.

* * * * *